US012622530B2

(12) United States Patent
Eigenmann et al.

(10) Patent No.: US 12,622,530 B2
(45) Date of Patent: May 12, 2026

(54) WELDING APPARATUS FOR STRINGS OF SPRINGS

(71) Applicant: L&P Property Management Company, South Gate, CA (US)

(72) Inventors: Guido Eigenmann, Carthage, MO (US); Darrell A. Richmond, Carthage, MO (US); Bernhard Bauer, Oberuzwil (CH); Urs Liechti, Goldach (CH); Andreas Meier, Roggwil (CH)

(73) Assignee: L&P Property Management Company, Carthage, MO (US)

( * ) Notice: Subject to any disclaimer, the term of this patent is extended or adjusted under 35 U.S.C. 154(b) by 127 days.

(21) Appl. No.: 18/594,128

(22) Filed: Mar. 4, 2024

(65) Prior Publication Data

US 2024/0206636 A1 Jun. 27, 2024

Related U.S. Application Data

(60) Continuation of application No. 17/212,287, filed on Mar. 25, 2021, now Pat. No. 12,245,701, which is a (Continued)

(51) Int. Cl.

*B65B 9/06* (2012.01)
*A47C 27/05* (2006.01)
(Continued)

(52) U.S. Cl.

CPC .......... *A47C 27/064* (2013.01); *A47C 27/053* (2013.01); *A47C 27/062* (2013.01); (Continued)

(58) Field of Classification Search

CPC ........... A47C 27/064; B65B 9/00; B65B 9/06; B65B 51/10; B65B 51/146; B65B 9/08
See application file for complete search history.

(56) References Cited

U.S. PATENT DOCUMENTS 1,466,617 A 8/1923 Foster
3,229,442 A * 1/1966 Hans ......................... B65B 9/12 53/550

(Continued)

FOREIGN PATENT DOCUMENTS

DE 202017101671 U1 4/2017
EP 0624545 A1 11/1994
WO 2005085123 A1 9/2005

OTHER PUBLICATIONS

European Patent Office, Euopean Search Report for EP 24180526, 7 Pages.

*Primary Examiner* — Gloria R Weeks
(74) *Attorney, Agent, or Firm* — Wood Herron & Evans LLP

(57) ABSTRACT

A pocketed spring assembly comprises parallel strings, each string joined to at least one adjacent string. At least some of the strings have springs of different gauge wire and some of the pockets of the strings having springs of different gauge wire are spliced together. At least some of the strings have springs of different geometries and some of the pockets of the strings having springs of different geometries are spliced together. At least some strings may have end sections with springs different than a middle section therebetween, the springs of the end sections being firmer than the springs of the middle section.

20 Claims, 19 Drawing Sheets

Related U.S. Application Data division of application No. 16/418,041, filed on May 21, 2019, now Pat. No. 11,109,686.

(60) Provisional application No. 62/684,334, filed on Jun. 13, 2018.

(51) Int. Cl.

| | |
|---|---|
| ***A47C 27/06*** | (2006.01) |
| ***A47C 27/07*** | (2006.01) |
| ***B68G 7/00*** | (2006.01) |
| *A47C 7/20* | (2006.01) |
| *A47C 7/34* | (2006.01) |
| *A47C 7/35* | (2006.01) |

(52) U.S. Cl.

CPC ................ *A47C 27/07* (2013.01); *B68G 7/00* (2013.01); *A47C 7/20* (2013.01); *A47C 7/347* (2013.01); *A47C 7/35* (2013.01)

(56) References Cited

U.S. PATENT DOCUMENTS

| | | | | | |
|---|---|---|---|---|---|
| 3,668,816 | A | 6/1972 | Thompson | | |
| 4,106,265 | A * | 8/1978 | Aterianus | B65B 9/06 | 53/550 |
| 5,040,255 | A * | 8/1991 | Barber, Jr. | A47C 27/063 | 5/718 |
| 5,303,530 | A * | 4/1994 | Rodgers | A47C 27/064 | 53/553 |
| 5,351,464 | A * | 10/1994 | Francioni | B29C 66/0326 | 53/550 |
| 5,433,063 | A * | 7/1995 | Kovacs | B65B 25/146 | 53/550 |
| 5,514,029 | A * | 5/1996 | Schutz | B65B 9/042 | 452/30 |
| 5,553,443 | A * | 9/1996 | St. Clair | B65B 63/026 | 53/DIG. 2 |
| 6,247,293 | B1 * | 6/2001 | Todd | B29C 66/431 | 53/329.2 |
| 6,260,331 | B1 * | 7/2001 | Stumpf | B29C 66/232 | 53/436 |
| 6,295,676 | B1 | 10/2001 | Warner | | |
| 6,336,305 | B1 * | 1/2002 | Graf | B68G 9/00 | 53/114 |
| 6,467,239 | B2 * | 10/2002 | Mossbeck | B65B 63/024 | 53/118 |
| 6,591,436 | B2 * | 7/2003 | de Santis | B68G 9/00 | 5/655.8 |
| 6,684,435 | B1 | 2/2004 | Wells | | |
| 7,194,777 | B2 * | 3/2007 | Edling | A47C 27/064 | 267/89 |
| 7,254,929 | B1 * | 8/2007 | Schutz | A22C 13/0003 | 452/30 |
| 9,027,314 | B2 * | 5/2015 | Zeiler | B29C 66/816 | 53/550 |
| 10,357,116 | B2 * | 7/2019 | Fisher | A47C 27/15 | |
| 2004/0103479 | A1 | 6/2004 | Mossbeck et al. | | |
| 2004/0128773 | A1 | 7/2004 | Barber | | |
| 2005/0257883 | A1 | 11/2005 | Anagnostopoulos | | |
| 2011/0120059 | A1 * | 5/2011 | Andreotti | B29C 66/81427 | 53/451 |
| 2012/0198793 | A1 * | 8/2012 | Vietz | B65B 9/2042 | 222/77 |
| 2016/0001498 | A1 | 1/2016 | Voegler et al. | | |
| 2017/0152064 | A1 | 6/2017 | Aurand | | |
| 2018/0118390 | A1 * | 5/2018 | Mulder | B65B 31/04 | |
| 2022/0378216 | A1 * | 12/2022 | Sternving | B68G 15/00 | |

* cited by examiner

WELDING APPARATUS FOR STRINGS OF SPRINGS

CROSS REFERENCE TO RELATED APPLICATIONS

This application is a continuation of U.S. patent application Ser. No. 17/212,287 filed Mar. 25, 2021, a Divisional of U.S. patent application Ser. No. 16/418,041 filed May 21, 2019 (pending), which claims the benefit of priority to U.S. Provisional Patent Application No. 62/684,334 filed Jun. 13, 2018, each one of which is fully incorporated herein.

FIELD OF THE INVENTION

This invention relates generally to bedding and seating products and, more particularly, to pocketed spring assemblies used in bedding and seating products.

BACKGROUND OF THE INVENTION

Mattress spring core construction over the years has been a continuously improving art with advancements in materials and machine technology. A well-known form of spring core construction is known as a Marshall spring construction wherein metal coil springs are encapsulated in individual pockets of fabric and formed as elongate or continuous strings of pocketed coil springs. In an earlier form, these strings of coil springs were manufactured by folding an elongate piece of fabric in half lengthwise to form two plies of fabric and stitching transverse and longitudinal seams to join the plies of fabric to define pockets within which the springs were enveloped.

Improvements in spring core constructions have involved the use of fabrics, which are thermally or ultrasonically weldable to themselves. One such cost-effective fabric is a spun-bonded polypropylene fabric. By using such welding techniques, these fabrics have been advantageously used to create strings of individually pocketed coil springs wherein transverse and longitudinal welds, instead of stitching, are used to form the pockets encapsulating the springs.

Once strings of pocketed springs are constructed, they may be assembled to form a spring core construction for a mattress, cushion or the like by a variety of methods. For example, multiple or continuous strings may be arranged in a row pattern corresponding to the desired size and shape of a mattress or the like, and adjacent rows of strings may be interconnected by a variety of methods. The result is a unitary assembly of pocketed coil springs serving as a complete spring core assembly.

A pocketed spring assembly may be surrounded with a border made of foam or any other suitable material to provide edge support around the perimeter of the pocketed spring assembly. Such a pocketed spring assembly is mounted upon a base and is completely enclosed within an upholstered covering material. The base and border are known in the industry as a "bucket" into which a pocketed spring assembly may be inserted before the "bucket" is covered with one or more padding or cushioning layers. Upon receiving multiple pocketed spring assemblies, a mattress manufacturer must insert each of the pocketed spring assemblies inside a bucket specifically constructed to receive a specified size of pocketed spring assembly. The mattress manufacturer must construct the foam encasements or "buckets" of different sizes via separate processes, which have proven to be costly due to the labor cost required.

Mattress manufacturers would prefer to eliminate the process of building foam encasements or "buckets" and instead receive a pocketed spring assembly within built-in edge supports along all four sides of the pocketed spring assembly. It is generally known within the bedding industry that edge supports made of pocketed springs are more durable than foam edge supports. Pocketed spring assemblies having pocketed spring edge supports may be roll packed for shipping whereas those having foam edge supports are not easily roll packed for shipping.

Pocketed spring assemblies made by joining parallel strings of individually pocketed springs have been made with four sides of edge support due to pocket coil machines capable of changing the springs within a strand or string of individually pocketed springs. Such modern pocket coil machines may further create posturized pocketed spring assemblies with zones or areas of different firmness.

While modern pocket coil machines may change springs "on the fly", the springs being individually pocketed to create edge support, the springs come from the same coiler, so the springs are all the same gauge within a string.

Therefore, there is a need for a pocketed spring assembly which has different zones or regions of different firmness due to different springs within the pockets being made from different coilers and some pockets within a string being spliced together.

There is further a need for a pocketed spring assembly which has four sides of edge support with the end sections of the internal strings being made of a heavier gauge wire than the internal springs.

There is further a need for a method of making a continuous string of springs having sections of different properties or geometries to be inserted into an assembler.

SUMMARY OF THE INVENTION

According to one aspect of the invention, a bedding or seating product having four sides of edge support or perimeter edge support is provided. The product comprises a pocketed spring assembly comprising a plurality of parallel strings of springs including exterior strings and interior strings. They are typically of approximately the same height but may be different heights. Each string is joined to at least one adjacent string in any known manner. In addition, each string may be joined to at least one scrim sheet or substrate for stability purposes. Each string comprises first and second opposed plies of fabric and a plurality of pockets formed along the length of the string by transverse or separating seams joining the first and second plies.

At least one spring is positioned in each pocket. Each of the springs has upper and lower end turns and a plurality of central convolutions between the end turns. At least one of the central convolutions may have a barrel diameter greater than the diameters of the other convolutions of the spring. Such a spring is known in the industry as a barrel-shaped coil spring. However, springs having other shapes may be used in accordance with the principals of the present invention.

At least some of the strings have springs of different gauge wire. At least two of the pockets of the strings having springs of different gauge wire are spliced together.

Cushioning materials may be placed on one or both sides of the pocketed spring assembly, and a covering may encase the pocketed spring assembly and cushioning materials.

In any of the embodiments, the strings of springs may extend longitudinally or transversely. A bedding or seating product may be posturized into regions or zones of different firmness by incorporating different sections of strings of springs into the product. In some of the embodiments described herein, a pocketed spring assembly has a firmer perimeter than the interior core of the assembly due to different springs located in the pockets of the strings making the pocketed spring assembly.

In another aspect, a pocketed spring assembly for a bedding or seating product is provided. The pocketed spring assembly comprises interior and exterior parallel strings of springs which may be approximately the same height. Each string is joined to at least one adjacent string. Each of the strings comprises a plurality of interconnected pockets. Each of the pockets contains at least one wire spring or other resilient member encased in fabric. The fabric is joined to itself along a longitudinal seam and has first and second opposed plies of fabric on opposite sides of the springs. The fabric of the first and second plies is joined by transverse seams.

At least some of the strings have pocketed springs of different properties or geometries therein and some of the pockets of the strings having pocketed springs of different properties or geometries are welded or spliced together. The firm springs may be firmer than the soft springs due to spring properties may include out-of-pocket height, gauge of wire, barrel diameter, spring geometry, spring shape, number of central convolutions, wire composition or any combination thereof.

In another aspect, a pocketed spring assembly for a bedding or seating product comprises a plurality of parallel strings of springs. Each string is joined to at least one adjacent string. Each of the strings comprises a plurality of interconnected pockets. Each of the pockets contains at least one spring or other resilient member encased in fabric. The fabric is joined to itself along a longitudinal seam and has first and second opposed plies of fabric on opposite sides of the springs. The fabric of the first and second plies is joined by transverse seams.

Each of the internal strings has multiple sections. The pocketed springs of at least one section have different properties such as they are of a different geometry or are of a different gauge wire than the pocketed springs, for example, than the pocketed springs of another section of the internal string. Adjacent pockets of different sections are spliced together which originate from different supply strings.

According to another aspect of the invention, a method of making a sectioned continuous string of pocketed springs for use in an assembler is disclosed. The method comprises cutting a first supply string of pocketed springs, leaving a first tab. The next step comprises cutting a second supply string of pocketed springs, leaving a second tab. The next step comprises splicing or welding overlapping the first and second tabs of the first and second supply strings of pocketed springs.

According to another aspect of the invention, a method of making a sectioned continuous string of pocketed springs for use in an assembler is disclosed. The method comprises providing a first supply string of pocketed springs containing first springs and cutting the first supply string of pocketed springs to a desired length. The next step comprises providing a second supply string of pocketed springs containing springs different than the first springs. The next step comprises cutting the second supply string of pocketed springs to a desired length. The next step comprises splicing or welding overlapping tabs of the first and second supply strings of pocketed springs.

According to another aspect of the invention, a method of making a sectioned continuous string of pocketed springs for use in an assembler is disclosed. The method comprises providing a starting string of pocketed springs having a starting tab and providing a first supply string of pocketed springs containing first springs, the first supply string having a first tab. A second supply string of pocketed springs containing springs different than the first springs and having a second tab is also provided. The next step comprises moving the first supply string of pocketed springs in-line with the starting string of pocketed springs such that the first tab overlaps the starting tab. The next step comprises welding the overlapped first and starting tabs together to create a combined string of pocketed springs. The next step comprises moving the combined string of springs downstream and cutting the combined string of pocketed springs at a desired location to create a combined tab. The next step comprises moving the first supply string of pocketed springs out-of-line with the combined string. The next step comprises moving the second supply string in-line with the combined string of pocketed springs such that the second tab overlaps the combined tab. The next step comprises welding the overlapped second and combined tabs together to create a long string of pocketed springs. The next step comprises moving the long string of springs downstream. The next step comprises cutting the second supply string of pocketed springs at a desired location to create another tab called a long tab.

According to another aspect of the invention, a method of making a sectioned continuous string of pocketed springs for use in an assembler is disclosed. The method comprises cutting a starting string of pocketed springs to create a first supply string of pocketed springs from a first coiler. The next step comprising providing a second supply string of pocketed springs from a second coiler. The step comprises moving the first supply string of pocketed springs from an in-line position aligned with the starting string of pocketed springs to an off-line position. The next step comprises moving the second supply string of pocketed springs to an in-line position with the starting string of pocketed springs. The next step comprises welding overlapped tabs from the second supply string of pocketed springs and the starting string of pocketed springs to create a combined string of pocketed springs. The next step comprises moving the first supply string of springs in-line with the combined string of pocketed springs. The next step comprises welding tabs from the first supply string of pocketed springs and the combined string of pocketed springs together.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
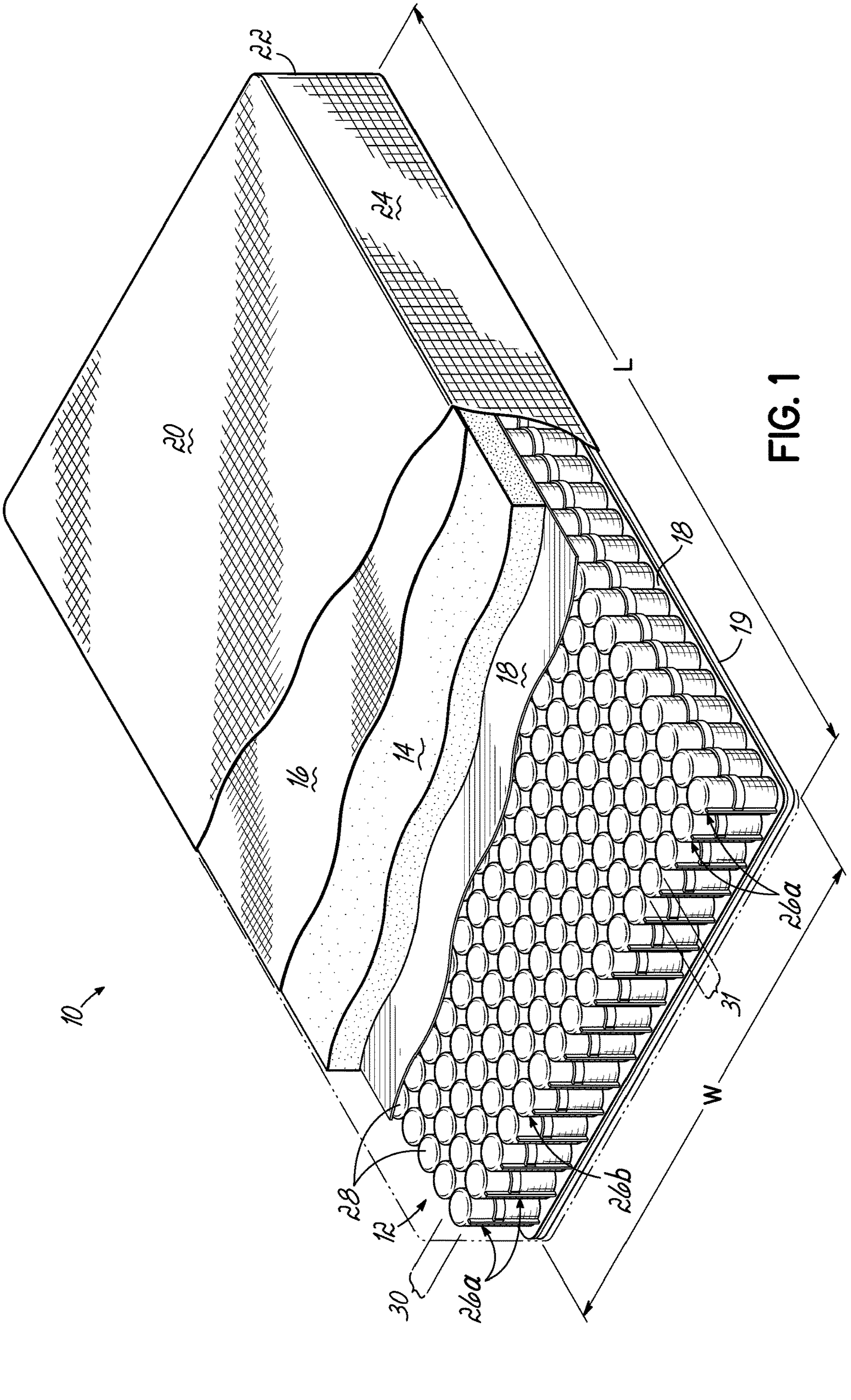
FIG. 1 is a perspective view, partially broken away, of a bedding or seating product incorporating one embodiment of pocketed spring assembly.
Figure 1A:
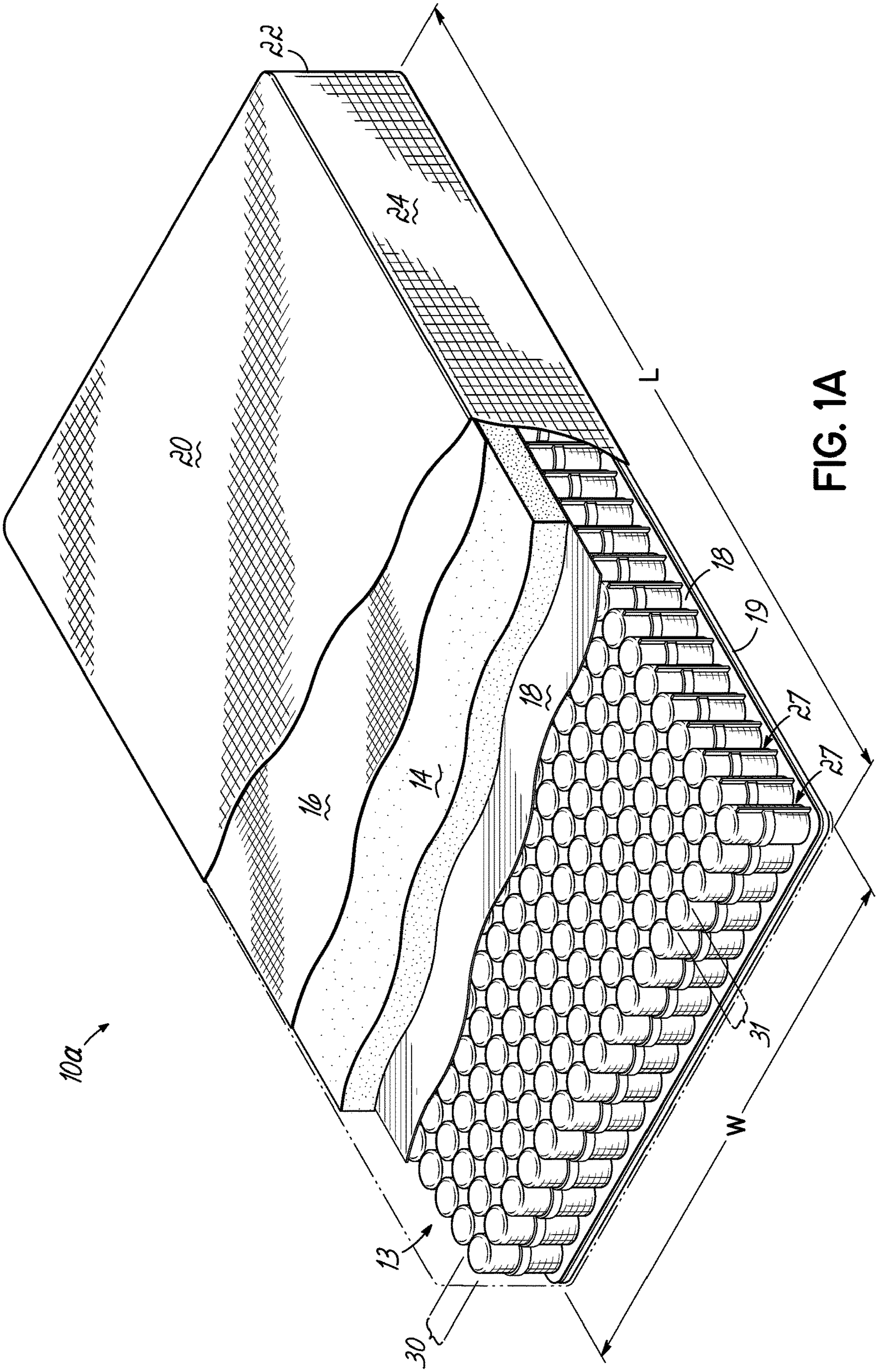
FIG. 1A is a perspective view, partially broken away, of a bedding or seating product incorporating another pocketed spring assembly.

Referring first to FIG. 1, there is illustrated a bedding product in the form of a single-sided mattress 10 incorporating the principles of the present invention. This product or mattress 10 comprises a pocketed spring assembly 12 over the top of which lay conventional padding or cushioning layers 14, 16 which may be foam, fiber, gel, a pocketed spring blanket or any other suitable materials or any combination thereof. Although two cushioning layers 14, 16 are shown in FIGS. 1 and 1A, any number of cushioning layers may be incorporated into the product.

The pocketed spring assembly 12 may include upper and lower scrim sheets 18 attached with adhesive to upper and lower surfaces of the strings of springs 26 of the pocketed spring assembly 12. The lower scrim sheet 18 may be adhesively secured to a base 19 which may be made of foam, fiber or any other desired material. In any of the embodiments shown or described herein, one scrim sheet or both scrim sheets may be omitted. Similarly, in any of the embodiments shown or described herein, the base 19 may be omitted. The pocketed spring assembly 12 and base 19 (if there is one) may be completely enclosed within an upholstered cover 20.

As shown in FIG. 1, fully assembled, the product 10 has a length "L" defined as the linear distance between opposed end surfaces 22 (only one being shown in FIG. 1). Similarly, the assembled product 10 has a width "W" defined as the linear distance between opposed side surfaces 24 (only one being shown in FIG. 1). In the product shown in FIG. 1, the length is illustrated as being greater than the width. However, it is within the scope of the invention that the length and width may be identical, as in a square product.

As shown in FIG. 1, pocketed spring assembly 12 is manufactured from multiple strings **26*a*, 26*b* of pocketed springs 28 joined together. As described below, strings 26*a* are called exterior strings of pocketed springs, and strings 26*b* are called interior strings of pocketed springs in this document. Each string 26*a*, 26*b* extends longitudinally or from head-to-foot along the full length of the pocketed spring assembly 12**.

Although the strings are illustrated as extending longitudinally or from head-to-foot in the pocketed spring assembly 12 of FIG. 1, the strings may extend transversely or from side-to-side as shown in the pocketed spring assembly 13 shown in the product **10*a* shown in FIG. 1A. As shown in FIG. 1A, pocketed spring assembly 13 comprises multiple transversely extending strings 27** of pocketed springs.

Figure 1B:
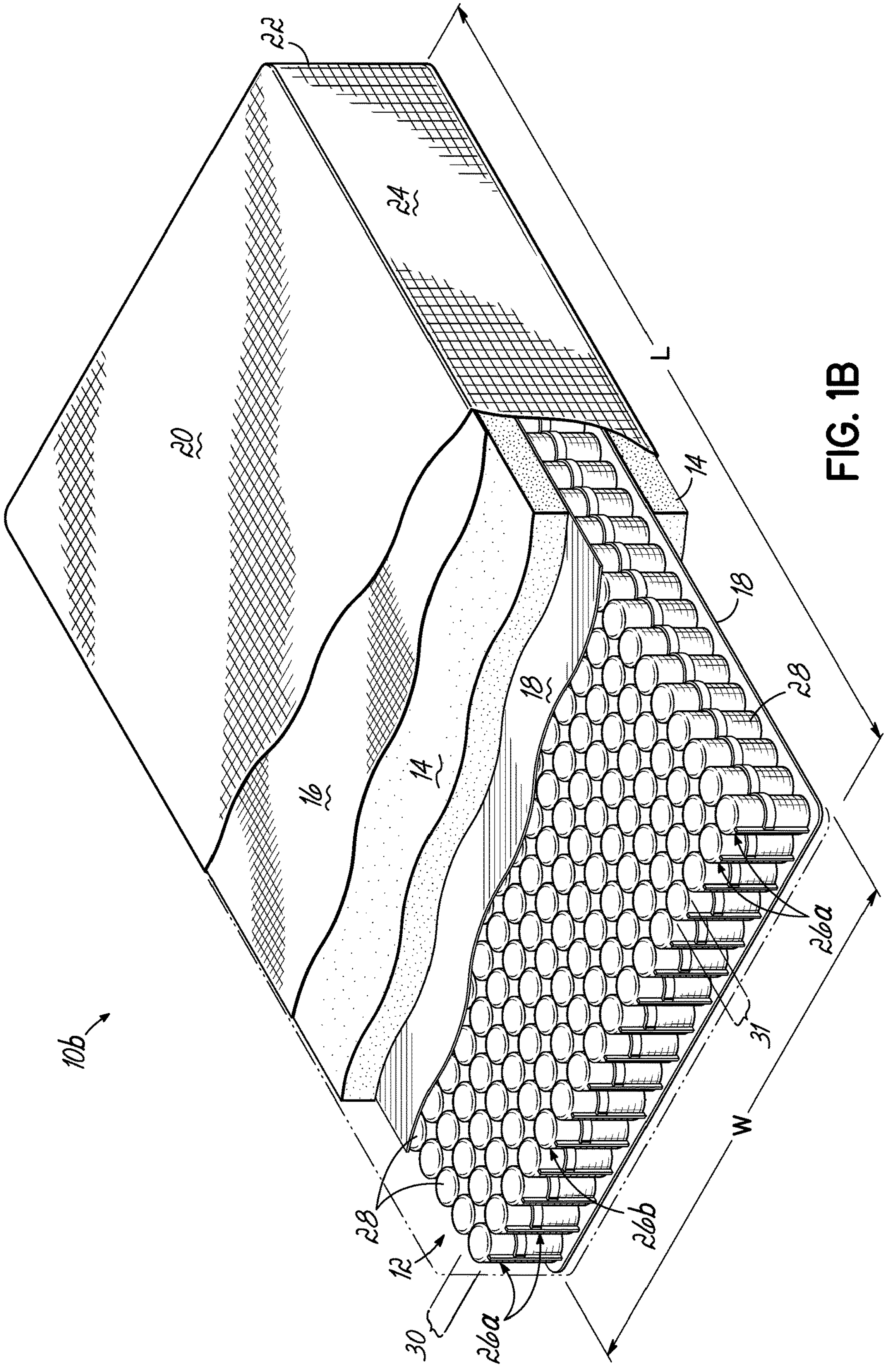
FIG. 1B is a perspective view, partially broken away, of a double-sided bedding product incorporating the pocketed spring assembly of FIG. 1.

FIG. 1B illustrates a double-sided mattress or product **10*b* comprising pocketed spring assembly 12 and scrim sheets 18 identical to those shown in the mattress 10 of FIG. 1. However, mattress 10*b* of FIG. 1B has conventional padding layers 14, 16 above and below the pocketed spring assembly 12. Although two cushioning layers 14, 16** are shown per side, any number of cushioning layers may be incorporated into the product on either side.

As shown in FIG. 1, pocketed spring assembly 12 comprises a plurality of strings **26*a*, 26*b* of pocketed springs extending from head-to-foot or longitudinally. As shown in FIG. 1A, pocketed spring assembly 13 comprises a plurality of strings 27** of pocketed springs extending from side-to-side or transversely. Due to the symmetric nature of the springs inside the strings, any embodiment of pocketed spring assembly shown or described herein may be used in a single-sided and/or a double-sided product.

Any of the padding or cushioning layers may be omitted in any of the embodiments shown or described herein. The novel features reside in the pocketed spring assembly. A pocketed spring assembly in accordance with the invention is not intended to be limited to use in products shown or described herein; but rather may be used in any product.

These strings and any other strings of pocketed springs described or shown herein, may be connected in side-by-side relationship in any manner as, for example, by gluing the sides of the strings together in an assembly machine, to create an assembly or matrix having multiple rows and columns of pocketed springs bound together as by gluing, welding or any other conventional assembly process commonly used to create pocketed spring cores or assemblies. Referring to FIGS. 1 and 1B, the longitudinally extending strings **26*a* and 26*b* may be joined so that the individually pocketed springs are aligned in transversely extending rows 30 and longitudinally extending columns 31. The same is true with transversely extending strings 27 shown in FIG. 1**A.

Figure 2:
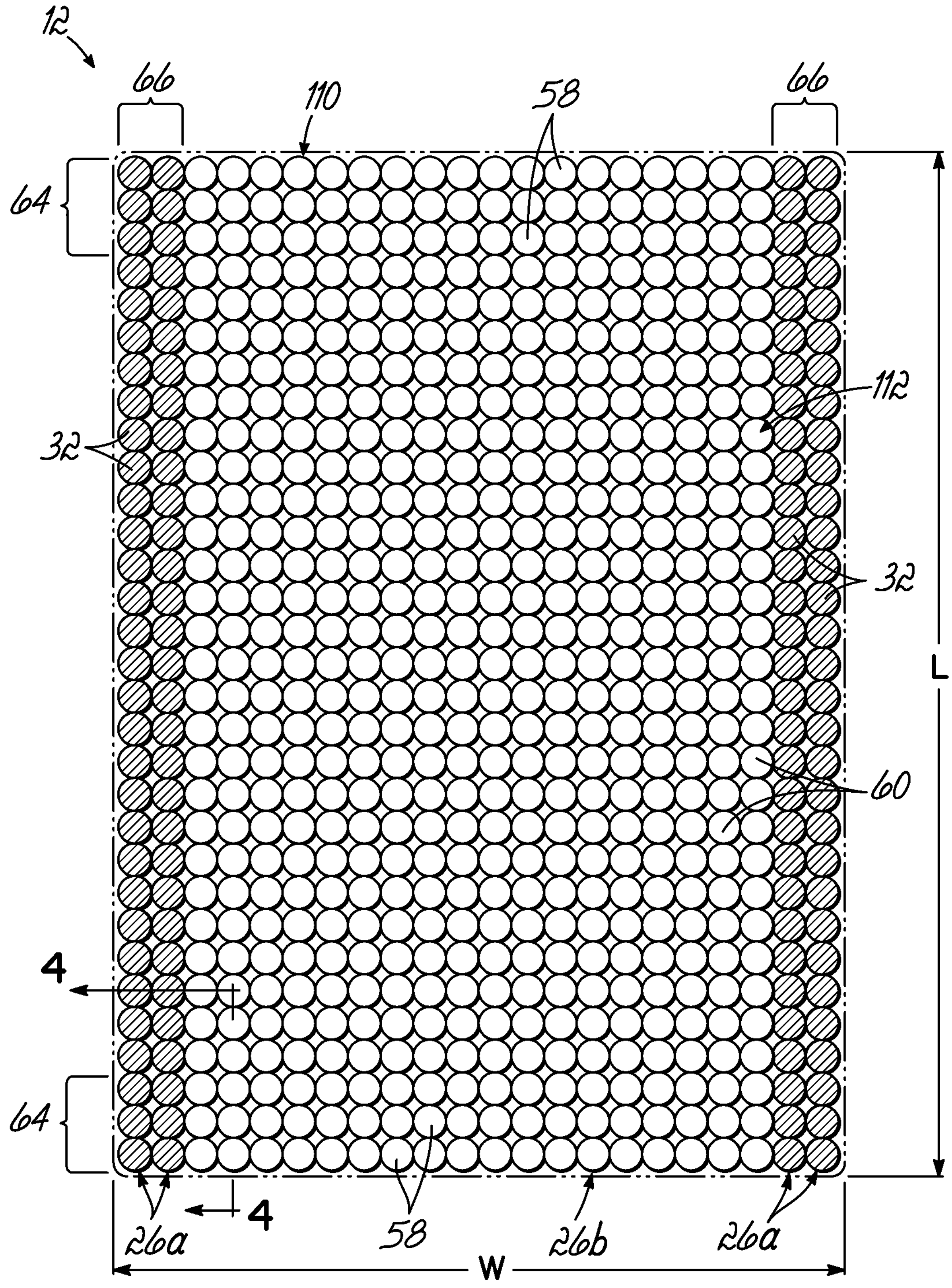
FIG. 2 is a top view of the pocketed spring assembly of FIG. 1.
Figure 3:
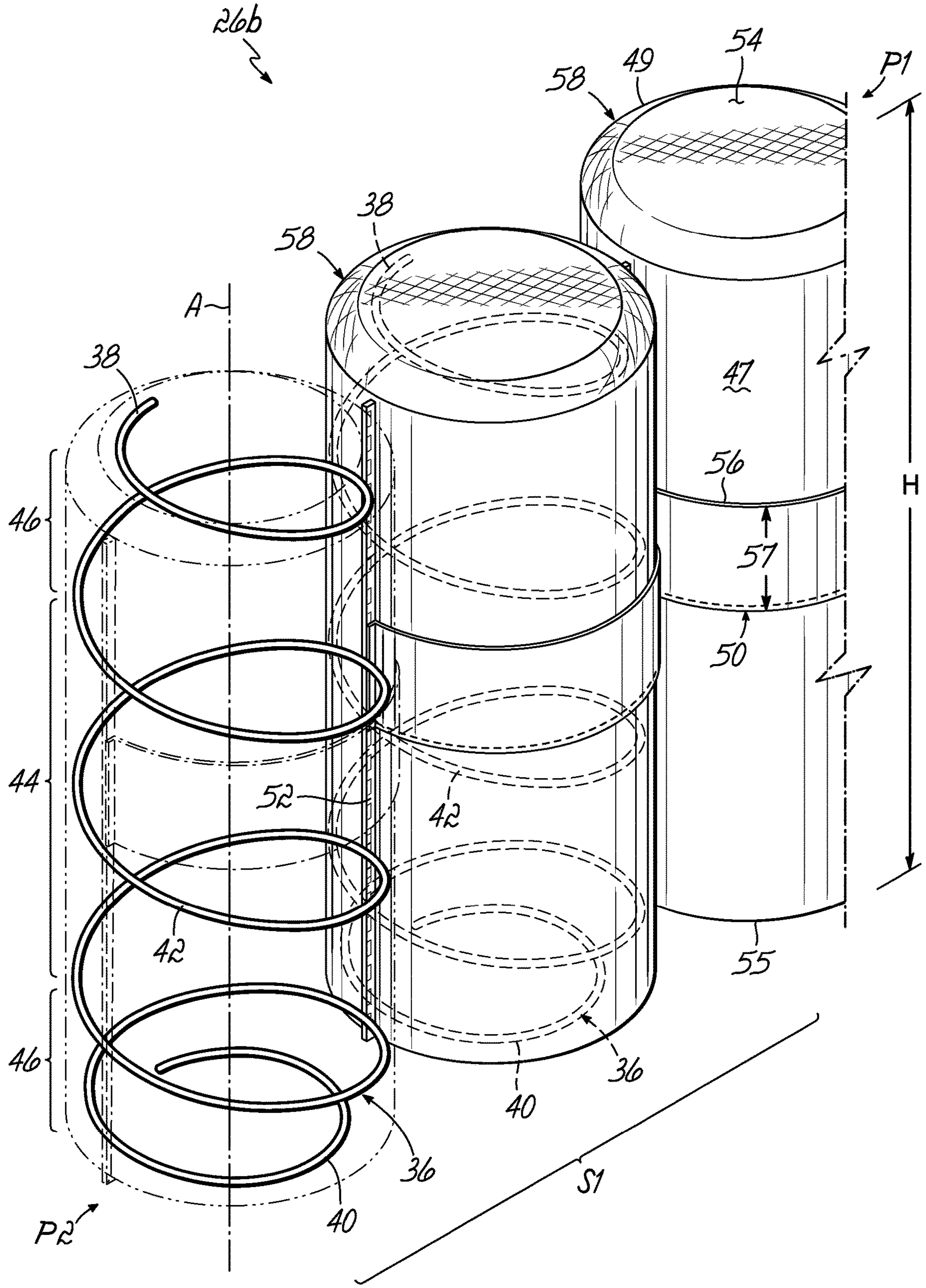
FIG. 3 is a perspective view of a portion of one of the interior strings of FIG. 2.
Figure 4:
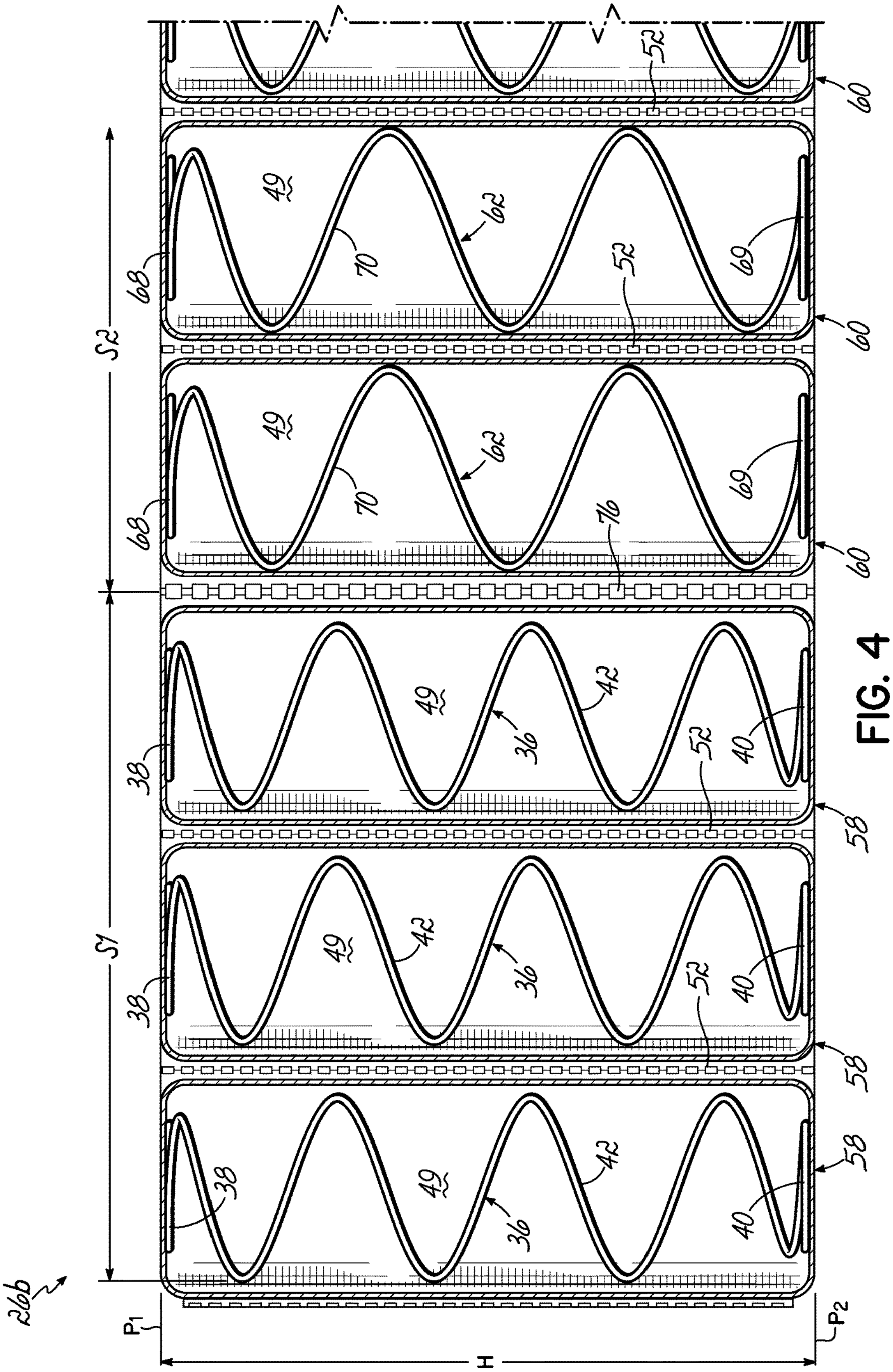
FIG. 4 is a cross-sectional view taken along the line 4-4 of FIG. 2 showing an outer portion of one of the interior strings.

FIGS. 2, 3 and 4 show one embodiment of pocketed spring assembly 12 which comprises two different longitudinally extending strings of pocketed springs: exterior strings of springs **26*a* and interior strings of springs 26*b*. As shown in FIGS. 3 and 3A, each of the strings 26*a*, 26*b* of pocketed spring assembly 12 is approximately the same height "H", providing pocketed spring assembly 12 a generally uniform height "H", but not need be a uniform height. As shown in FIG. 2, pocketed spring assembly 12 comprises two exterior longitudinally extending strings 26***a* on each side of multiple interior strings 26*b*. The number of exterior and interior strings 26*a*, 26*b* depends on the size of the product 10. Each exterior string 26*a* and each interior string 26*b*, respectively, extends the entire length "L" of the pocketed spring assembly.

As shown in FIG. 2, each set of two exterior strings 26*a* comprises a side section 66 of pocketed spring assembly 12. In some applications, each side section of a pocketed spring assembly may comprise more than or less than two strings of springs per side section. In other words, the number of exterior strings 26*a* may vary depending on the size of the product or other factors, such as the desired amount of side edge support.

The drawings show each of the exterior strings 26*a* being uniform from head-to-foot, i.e. not having sections with different springs in the pockets. The pockets of the exterior strings 26*a* are shown being the same diameter as the pockets of the interior strings, but may be any desired diameter or height. The exterior strings 26*a* function as side edge support and are not the focus of the present invention. It is within the scope of the present invention that a pocketed spring assembly has no exterior strings and each of the strings has at least two sections with different springs in at least two of the sections.

As best shown in FIG. 2, each interior string 26*b* has three outer pockets 58 at each end and inner pockets 60 therebetween. As best shown in FIG. 4, each outer pocket 58 has a firm spring 36 therein and each inner pocket 60 has a soft spring 62 therein. In the illustrated springs, the firm springs 36 have more convolutions than the soft springs 62.

As best shown in FIG. 3, each firm spring 36 has a central or longitudinal axis A, an upper end turn 38, a lower end turn 40, and a plurality of central convolutions 42 between the end turns. FIG. 3 illustrates a barrel-shaped firm spring 36 in which the diameter of the end turns 38, 40 is less than the diameter of the central convolutions 42. As best shown in FIG. 3, each barrel-shaped firm spring 36 is symmetrical, having a center or middle portion 44 and two identical end portions 46.

As best shown in FIG. 4, each soft coil spring 62 has an upper end turn 68, a lower end turn 69 and a plurality of central convolutions 70 between the end turns. FIG. 4 illustrates a barrel-shaped soft coil spring 62 in which the diameter of the end turns 68, 69 is less than the diameter of the central convolutions 70. As best shown in FIG. 4, at least one of the central convolutions 70 has an out-of-pocket barrel diameter greater than the diameters of the other convolutions of the soft spring 62. Although the firm and soft coil springs 36, 62 are illustrated as being barrel-shaped, either one may be any known shape including hour-glass, uniform diameter or any other known configuration.

As shown in FIG. 4, each interior string 26*b* has three sections, two end sections S1 (only one being shown) and a middle section S2 between the end sections. Adjacent sections are welded or spliced together with a weld 76, as shown in FIG. 4. In the example illustrated in FIGS. 6-15, each end section S1 originates from a second supply string 74 containing all firm springs 36. The middle section S2 originates from a first supply string 72 containing all soft springs 62. The coil springs within the first supply string 72 are soft springs 62 and the coil springs within the second supply string 74 are firm springs 36.

Preferably, one piece of fabric is used to create each section S1, S2 of each interior string 26*b*. FIG. 3 illustrates an end section S1 of an interior string 26*b* comprising a piece of fabric being folded over onto itself around three firm coil springs 36 at each end. As best shown in FIG. 3, opposite sides or plies 47, 49 of the fabric are welded or otherwise secured together to create a longitudinal seam 50 and a plurality of separating or transverse seams 52 of any desired length. FIG. 3 illustrates ply 47 being closest to the reader and ply 49 being behind the springs 36 or away from the reader. Although the drawings show separating or transverse seams 52 being a certain length, they may be any intended length and are not intended to be limited to the drawings. For example, they may be less than the height of the string in which they are used, as is known in the industry as "split top".

Although the seams or welds in the embodiments shown herein are shown as being heat-welded spaced rectangles, any of the seams described herein may be spaced dots, triangles or solid line segments without spaces.

As best shown in FIG. 3, opposed edges 56 of the piece of fabric used to create the end section S1 of an interior string 26*b* are aligned and spaced from the longitudinal seam 50 a linear distance indicated by numeral 57. Although the drawings indicated the longitudinal seam 50 being below the free edges 56 of the piece of fabric, the longitudinal seam 50 may be above the free edges 56 of the piece of fabric.

As shown in FIG. 3, section S1 of interior string 26*b* has a generally planar top surface 54 in a top plane $P_1$ and a parallel generally planar bottom surface 55 in a bottom plane $P_2$. The linear distance between the top and bottom surfaces 54, 55 of the interior string 26*b* defines a height H of the section S1 of interior string 26*b*. This linear distance further defines the height H of the pocketed spring assembly 12 because each of the exterior strings 26*a* and interior strings 26*b* has approximately the same height. Each section S1, S2 of the interior strings 26*b* has approximately the same height H because the height of the first supply string is the same height H. However, it is within the contemplation of the present invention that the heights of the supply strings be different resulting in interior strings having different heights.

Referring to FIG. 2, each interior string 26*b* of pocketed spring assembly 12 comprises a row of interconnected fabric pockets 58, 60 of the same height. Three fabric pockets 58 are located at each end of each interior string 26*b* with fabric pockets 60 therebetween. For purposes of this document, the outermost pockets 58 are considered outer pockets of the interior string 26*b*, and the pockets 60 therebetween are considered inner pockets of the interior string 26*b*. As shown in FIG. 4, within each interior string 26*b*, each outer pocket 58 contains a firmer spring 36 than the springs 62 within each inner pocket 60 for edge support. Although the drawings show each interior string 26*b* of pocketed spring assembly 12 having three outer pockets 58 at each end, it is within the scope of the invention that each interior string 26*b* may have one, two or any number of outer pockets 60 at each end of the interior string 26*b*.

As shown in FIG. 2, pocketed spring assembly 12 has opposite end sections 64 made up of solely firm pocketed springs 36. The end sections 64 and side sections 66 make up a picture-frame shape of edge support which provides increased stiffness around the perimeter of the pocketed spring assembly 12 because of the different springs within the pockets.

Although the firm springs 36 of the end sections S1 are illustrated having more convolutions or turns than the interior soft springs 62 of middle section S2 of each interior string 26*b*, the springs of the end sections S1 of the interior strings 26*b* may be firmer than the springs within the middle section due to any of the following or any combination thereof: being made of heavier gauge wire as described below and shown in FIG. 4A; having a greater out-of-pocket height; having more convolutions, having a different shape or anything else which is known in the industry as a different geometry.

In this embodiment, the pocketed spring assembly 12 has a four-sided perimeter section 110 surrounding an interior or core section 112. The perimeter section 110 of pocketed spring assembly 12 comprises pocketed tall springs 36. The core section 112 comprises pocketed soft springs 62. The pocketed spring assembly 12 has a uniform height H. Each side of the perimeter section 110 is firmer than the core section 112 due to the properties of the two different springs (firm and soft springs) in the two different sections: perimeter section 110 and core section 112. See FIG. 2.

Figure 4A:
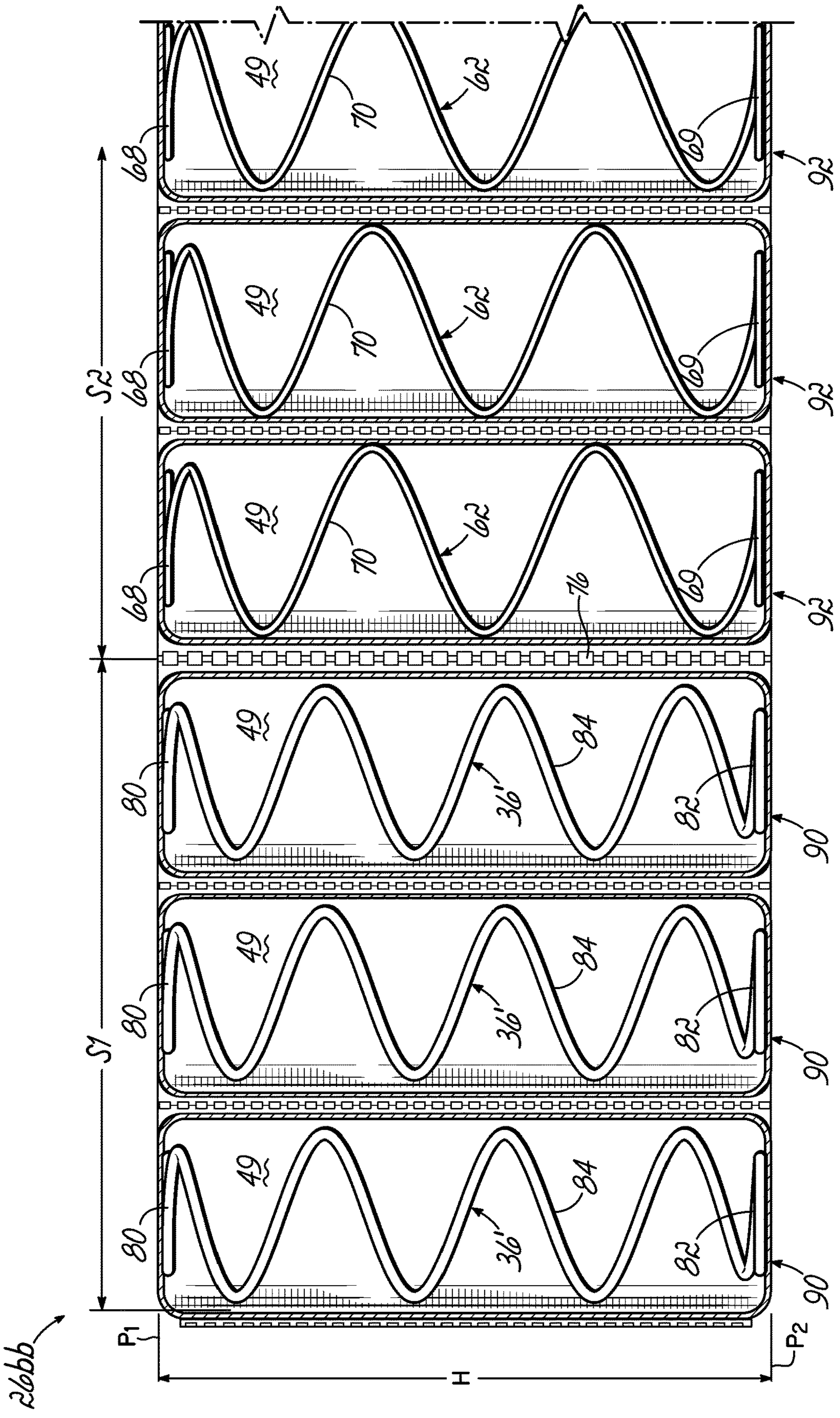
FIG. 4A is a cross-sectional view like FIG. 4 showing an outer portion of another interior string.

FIG. 4A illustrates an alternative interior string 26*bb* in which the firmer springs of the end sections are made of thicker or heavier gauge wire than the wire of the springs of the middle section. As shown in FIG. 4A, the firm springs 36' of the end sections S1 (only one being shown) may be made of a thicker or heavier gauge wire than soft springs 62 of middle section S2 of each interior string 26*b*. In one embodiment, the firm springs 36' are made of 13.75-gauge wire, and the soft springs 62 are made of 14-gauge wire. These gauges are not intended to be limiting, but merely an example.

Figure 5:
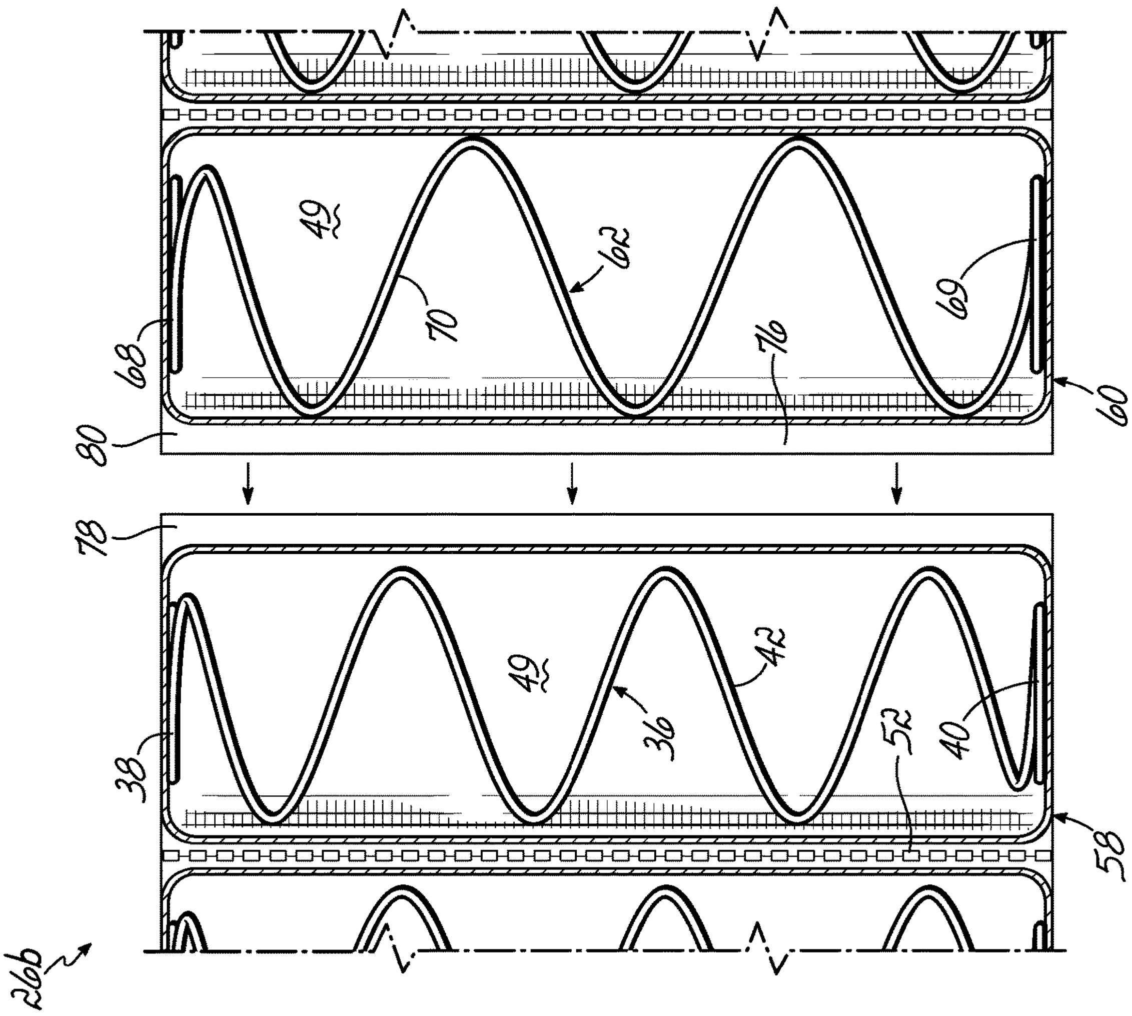
FIG. 5 is a cross-sectional view like FIG. 4 showing two sections of an interior string before their tabs are overlapped and welded together to join the two sections.

As shown in FIG. 5, the end sections S1 each have a fabric tab 78 at each end (only one being shown) and the middle section S2 has a fabric tab 80 at each end (only one being shown). The welding apparatus 82 shown in FIGS. 6-15 illustrates clamps used to locate the fabric tabs so two tabs overlap to be welded together with weld 76. FIG. 5 shows the fabric tabs 78, 80 separated before being overlapped and welded. This method is used whenever any two sections having different springs are spliced or welded together.

FIGS. 6-15 illustrate a method of making a finished sectioned continuous string of pocketed springs 86 which is passed to an assembler for assembly into a pocketed spring assembly. See FIG. 15. FIGS. 6-15 illustrate a welding apparatus 82 for joining two sections of pocketed springs with a splice or weld.

Figure 6:
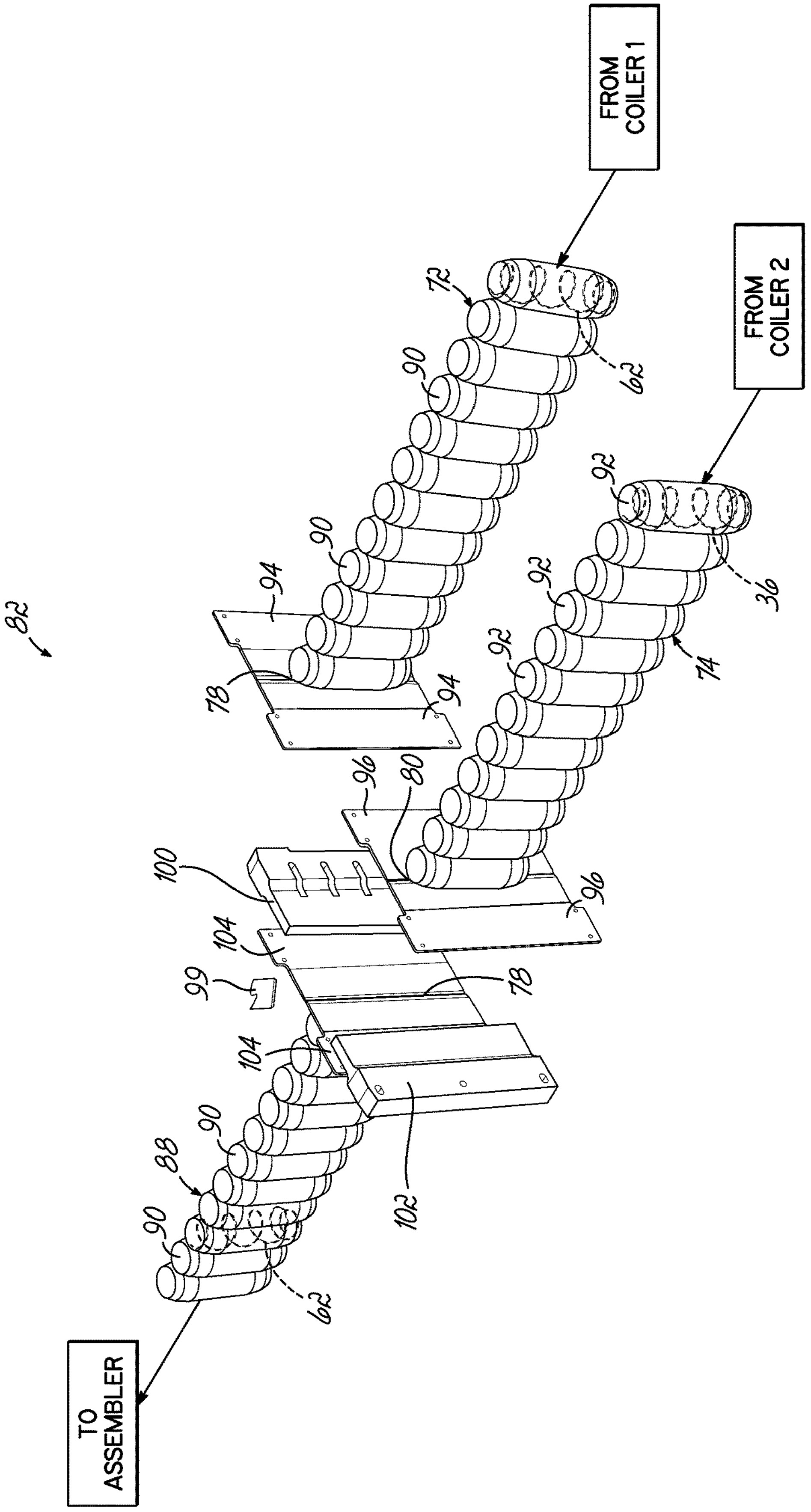
FIG. 6 is a perspective view of an apparatus for practicing the method of making a sectioned continuous string of springs for use in an assembler using first and second supply strings.

FIG. 6 illustrates a starting string of pocketed springs 88 downstream of the welding apparatus 82. The starting string of pocketed springs 88 has an upstream tab 78 held in place with clamps 104. For purposes of example only, the pockets 90 of the starting string of pocketed springs 88 downstream of the welding apparatus 82 all contain a soft spring 62. Originally, the starting string of pocketed springs 88 and the first supply string of pocketed springs 72 described below were one string of springs originating from coiler 1 before being cut and separated.

FIG. 6 shows a first supply string of pocketed springs 72 upstream of the welding apparatus 82 in an offset position from the direction of the starting string of pocketed springs 88. The first supply string of pocketed springs 72 has a downstream tab 78 held in placed and moved with clamps 94. The pockets 90 of the first supply string of pocketed springs 72 contain the same spring from coiler 1. For purposes of example only, the pockets 90 of the starting string of pocketed springs 88 all contain a soft spring 62 and came from coiler 1. However, they could contain a different spring.

FIG. 6 also shows a second supply string of pocketed springs 74 upstream of the welding apparatus 82 in an in-line position from the direction of the starting string of pocketed springs 88. The second supply string of pocketed springs 74 has a downstream tab 80 held in placed and moved with clamps 96. The pockets 92 of the second supply string of pocketed springs 74 contain the same springs from coiler 2 different than coiler 1. For purposes of example only, the pockets 92 all contain a firm spring 36. However, they could contain a different spring.

As shown in FIGS. 6-15, the welding apparatus 82 comprising a cutter 99, a sonotrode or welding horn 100 and an anvil 102. FIG. 6 shows the cutter 99 in a raised position in which it is not being used. Although the drawings show one configuration of welding apparatus 82, the welding apparatus may be different than shown in the drawings.

Figure 7:
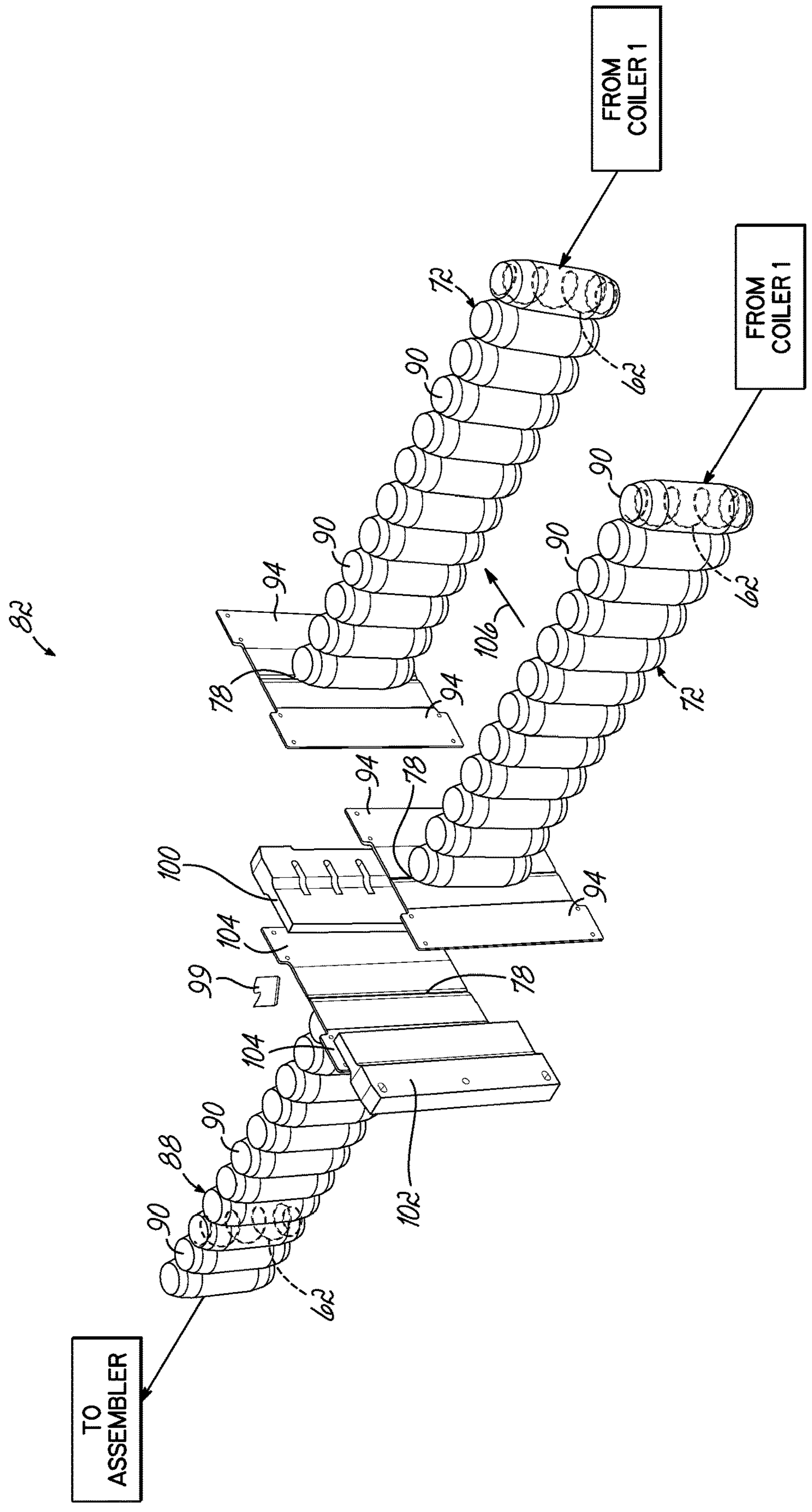
FIG. 7 is a perspective view showing the first supply string moving from an in-line position to an off-line position in the apparatus of FIG. 6.

FIG. 7 shows the first supply string of pocketed springs 72 upstream of the welding apparatus 82 after being clamped using clamps 94 and cut to separate the starting string of pocketed springs 88 downstream of the welding apparatus 82 from the first supply string of pocketed springs 72 upstream of the welding apparatus 82. FIG. 7 shows the first supply string of pocketed springs 72 upstream of the welding apparatus 82 being moved from an in-line position with the starting string of pocketed springs 88 downstream of the welding apparatus 82 to an offset position (to the right in FIG. 7) from the direction of the starting string of pocketed springs 88. See arrow 106. Such movement may be perfected by a channel changer (not shown).

Figure 8:
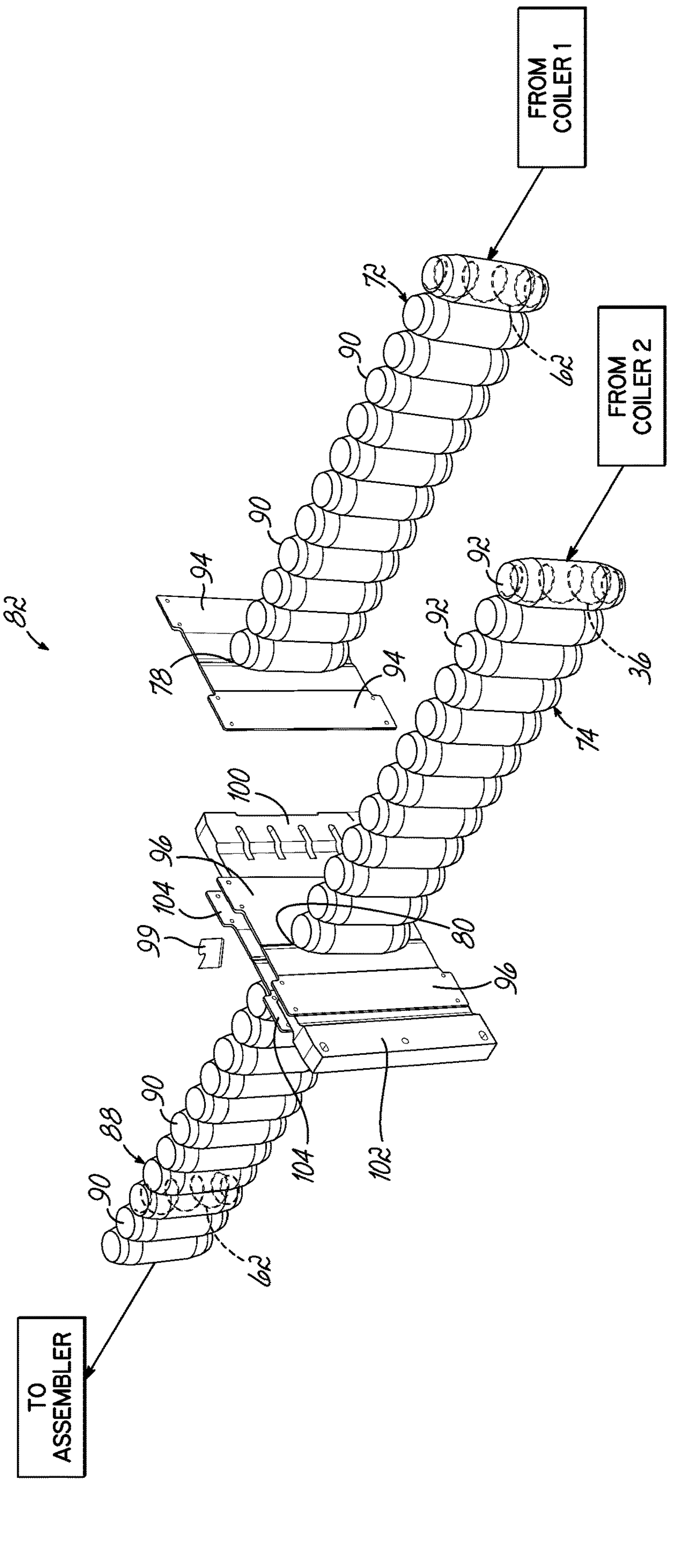
FIG. 8 is a perspective view showing the second supply string being positioned in line with the starting string to be welded together.

FIG. 8 shows the second supply string of pocketed springs 74 upstream of the welding apparatus 82 originating from coiler 2 being moved to an in-line position with the direction of the starting string of pocketed springs 88. As shown in FIG. 4, the upstream tab of fabric 78 of the starting string of pocketed springs 88 downstream of the welding apparatus 82 is overlapped with the upstream tab of fabric 80 of the second supply string of pocketed springs using clamps 104 and 96.

Figure 9:
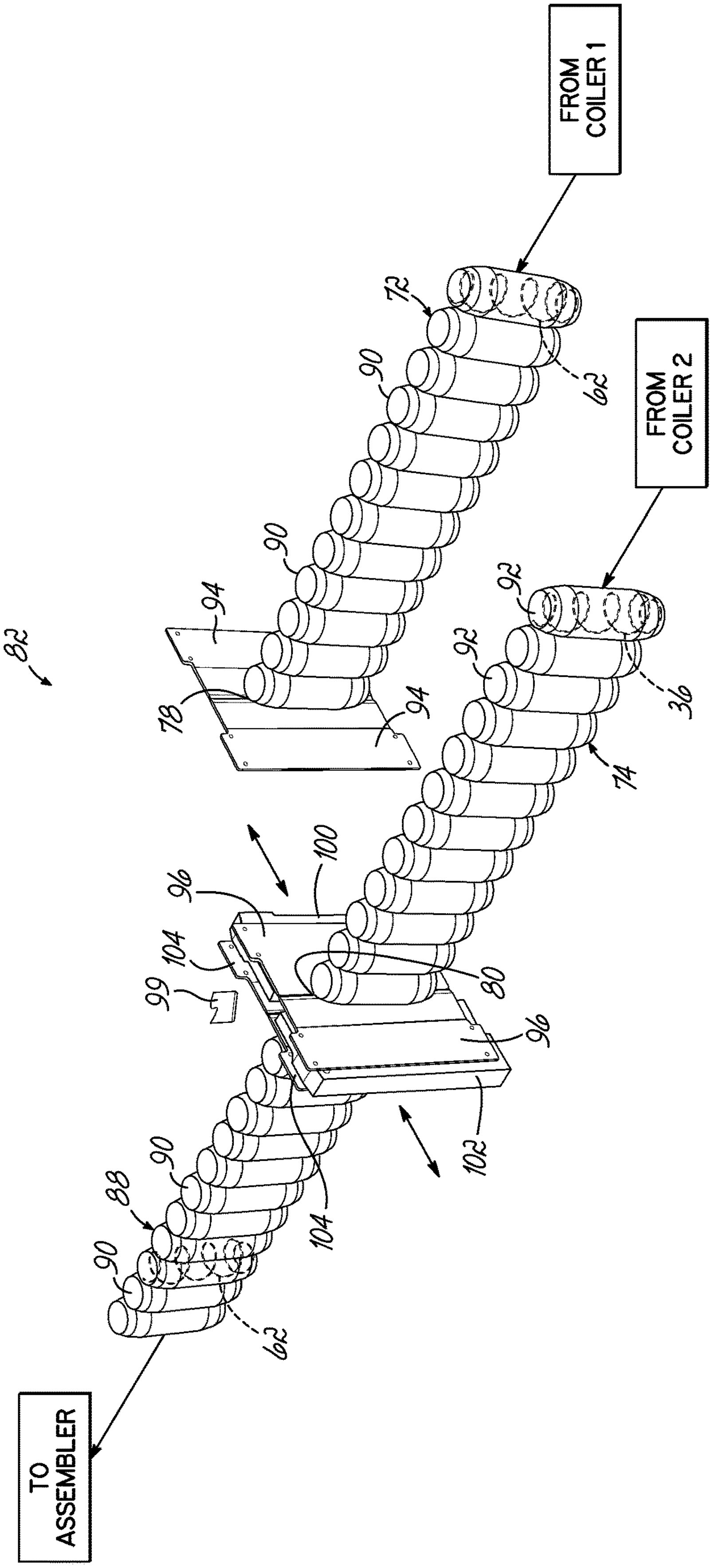
FIG. 9 is a perspective view showing the welding horn and anvil of the welding apparatus welding the second supply string to the starting string, the weld joining overlapping tabs of the second supply string and starting string.

FIG. 9 illustrates the next step in the process. FIG. 9 shows the anvil 102 and welding horn 100 are moved together simultaneously between clamps 104 and 96 to meet to weld the overlapped tabs of fabric 78, 80 together, resulting in a weld 76, as shown in FIG. 4. After the weld 76 is complete, the combined string of pocketed springs will be referred to herein as a combined string of pocketed springs 84.

Figure 10:
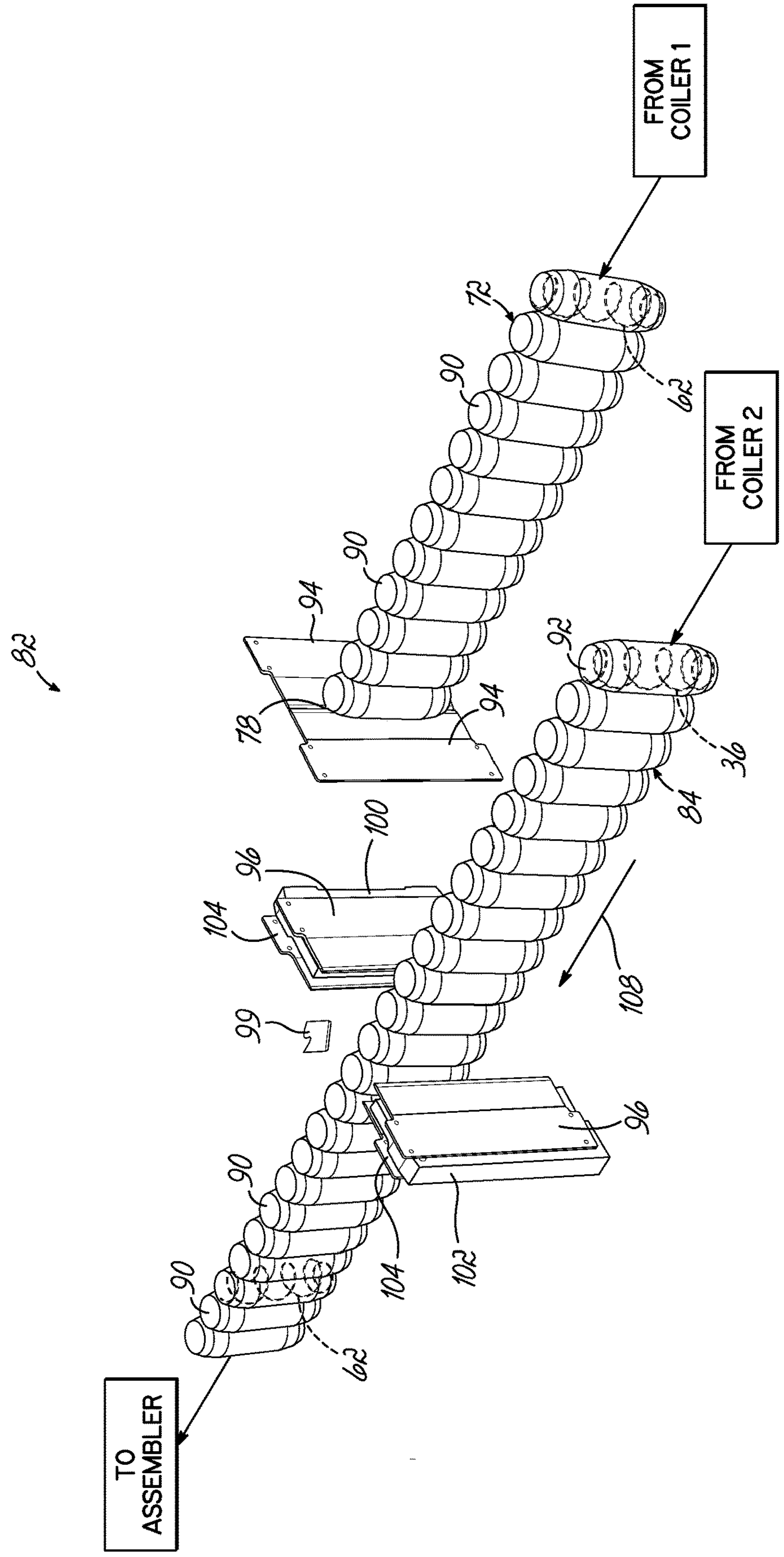
FIG. 10 is a perspective view showing the welding horn and anvil of the welding apparatus separating and the combined string moving downstream.

FIG. 10 illustrates the clamps 96 separated and the anvil 102 and welding horn 100 separated to allow the combined string of pocketed springs 84 to move downstream or indexed in the direction of arrow 108 a desired amount.

Figure 11:
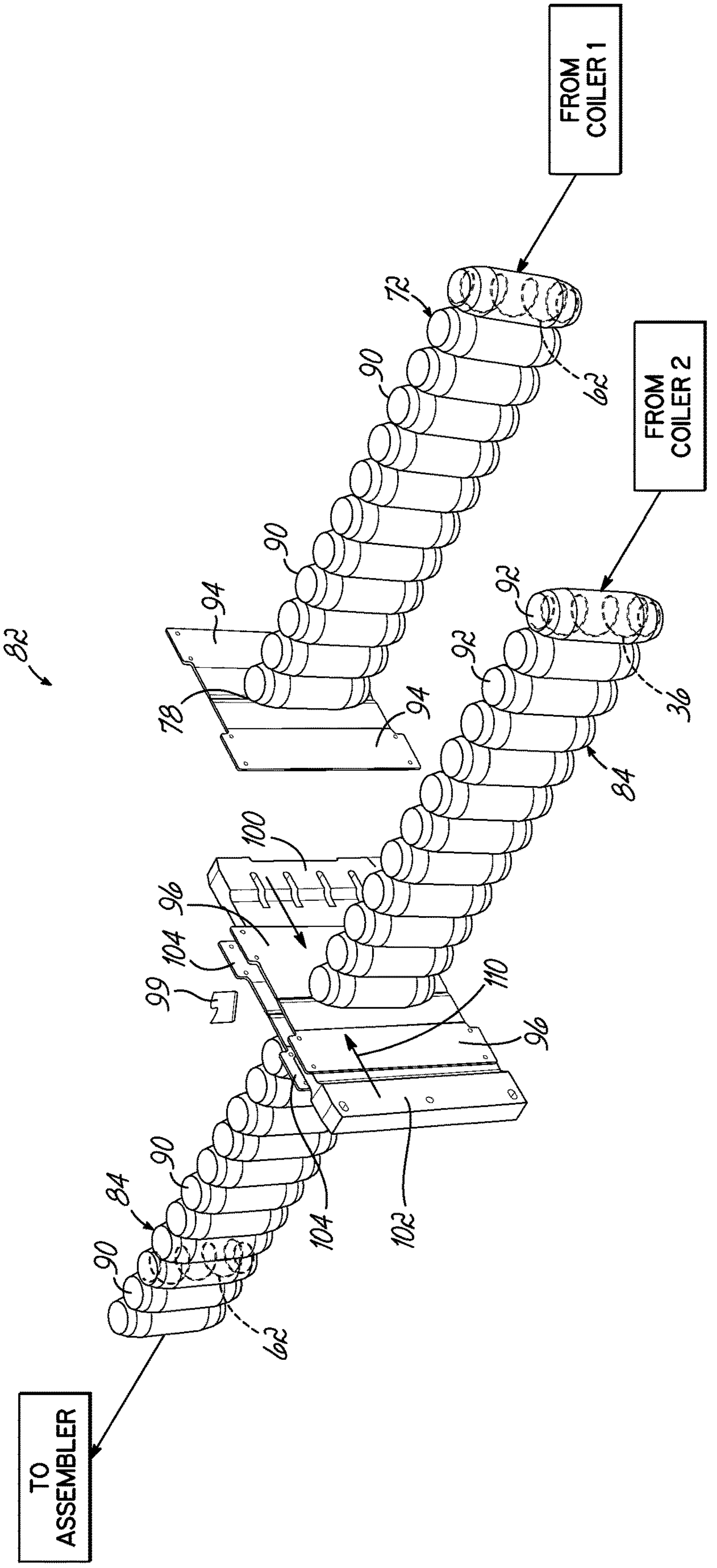
FIG. 11 is a perspective view showing the combined string being clamped and cut.

As shown in FIG. 11, after the combined string of pocketed springs 84 is indexed downstream, the clamps 96 are brought back together as shown by arrows 110 to clamp the fabric for cutting between pockets. As shown in FIG. 11, the portion of the combined string of pocketed springs 84 upstream of the clamps 96 is pulled upstream to stretch the fabric to increase the size of the transverse seams between adjacent pockets. See arrow 112.

Figure 12:
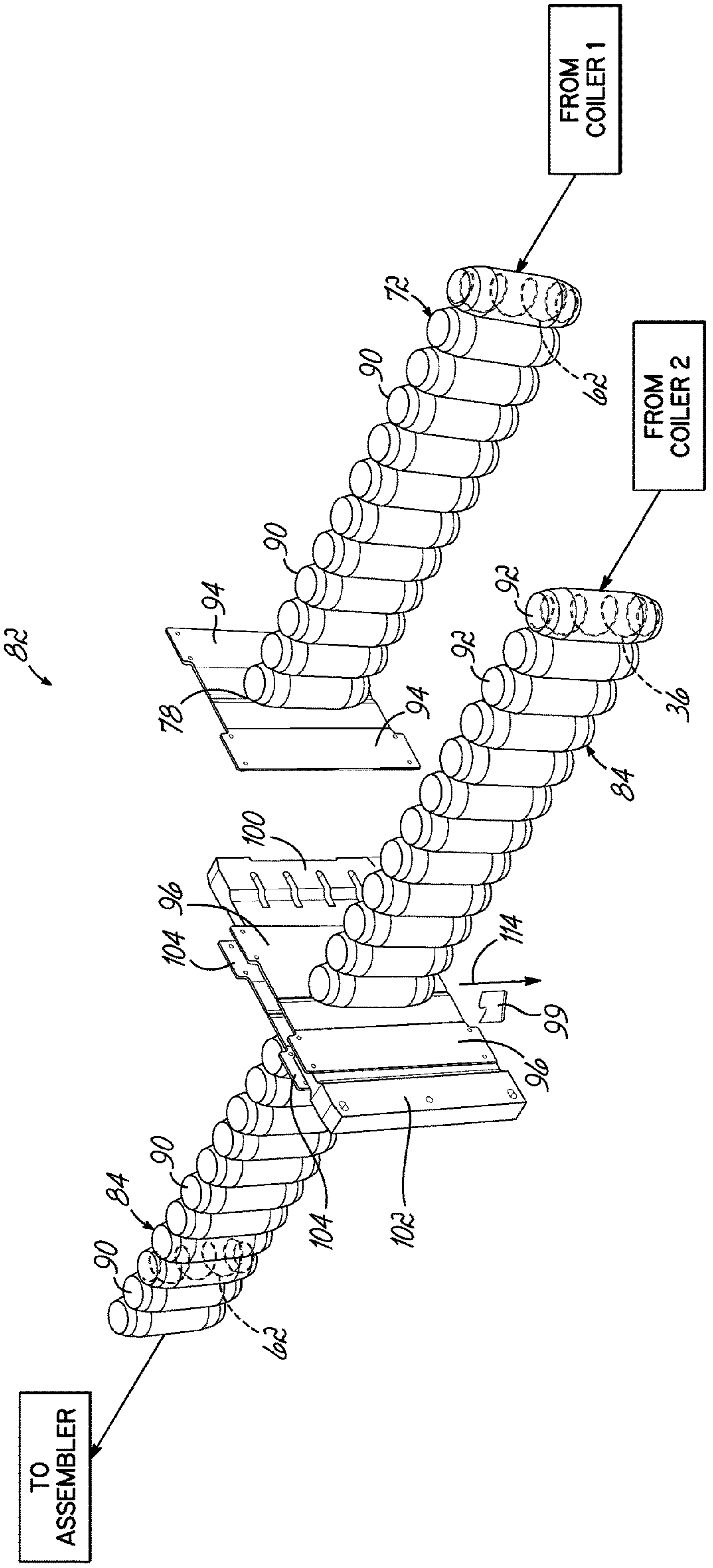
FIG. 12 is a perspective view showing the combined string being cut.

As shown in FIG. 12, the next step is that the cutter 99 is lowered from its raised position to its lowered position in the direction of arrow 114, thereby cutting the combined string of pocketed springs 84 between the clamps 96. Although one cutter is shown, any known cutting device may be used. After the cutting, the combined string of pocketed springs 84 may be separated into two parts, each part having a tab of fabric.

Figure 13:
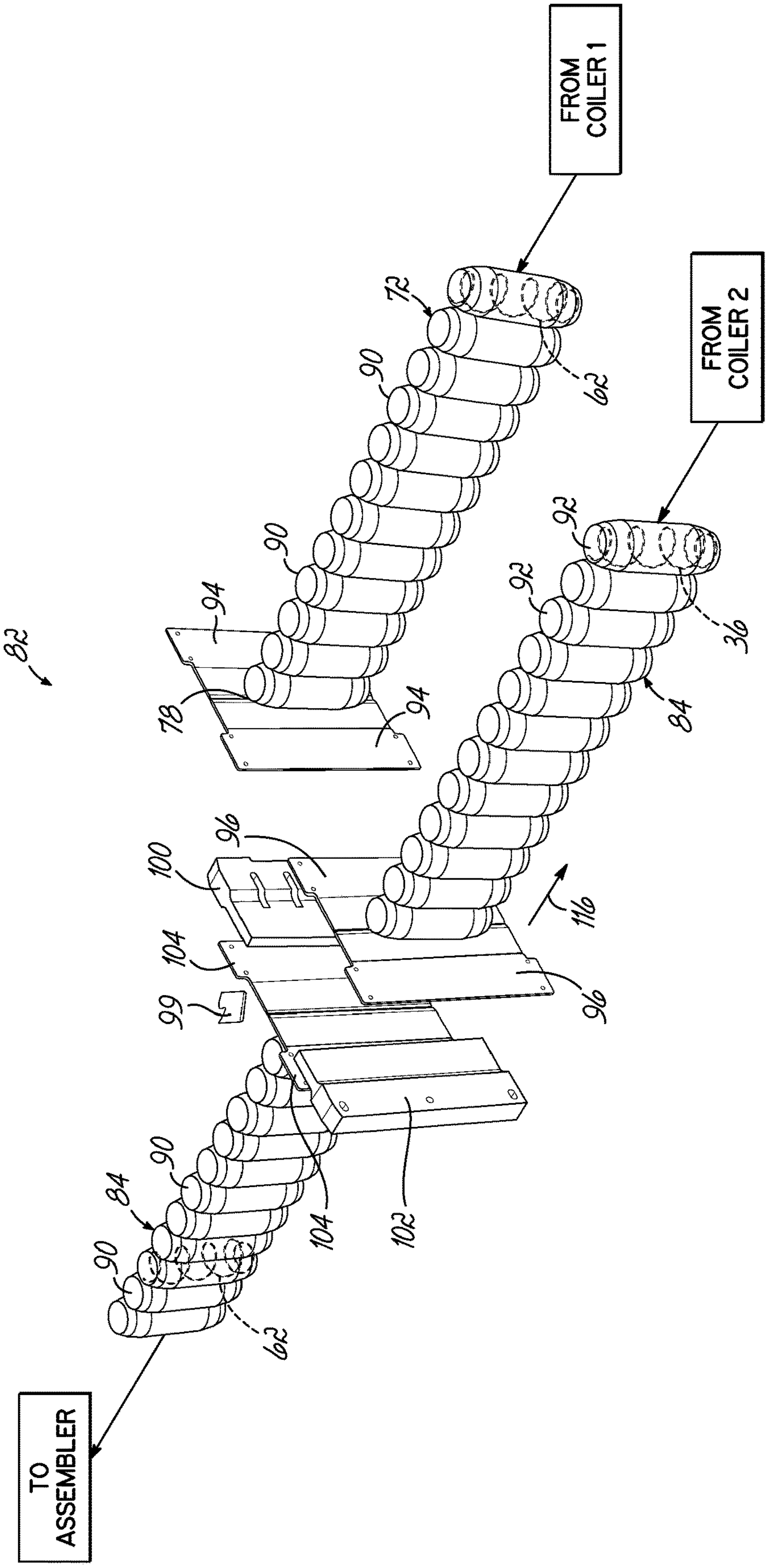
FIG. 13 is a perspective view showing the remaining second supply string being moved to an off-line position.
Figure 14:
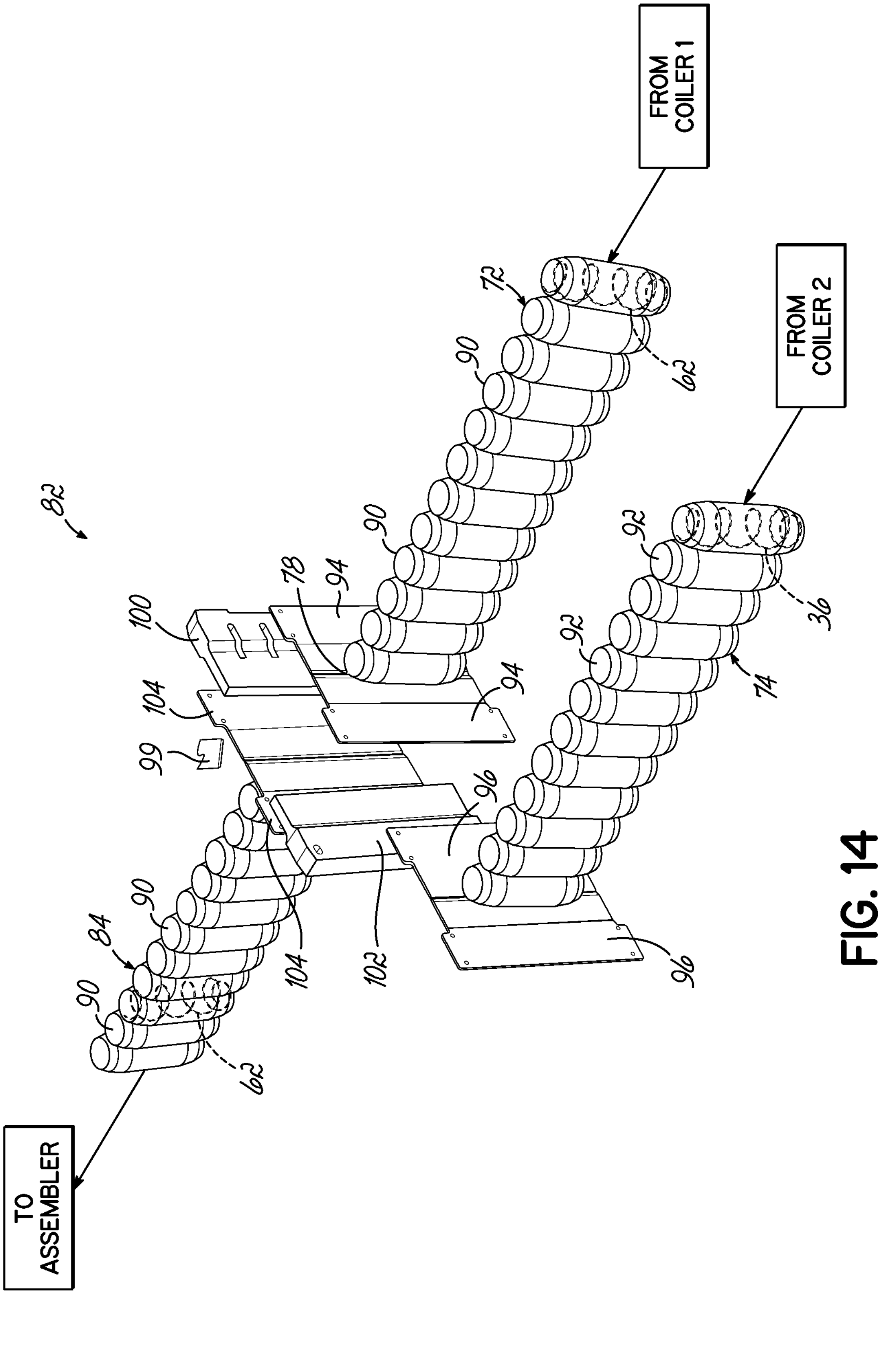
FIG. 14 is a perspective view showing the first supply string being moved to an in-line position.

As shown in FIG. 13, the next step is the portion or part of the combined string of pocketed springs 84 upstream of the cut is moved upstream in the direction of arrow 116 away from the welding apparatus 82. FIG. 14 illustrates the portion or part of the combined string of pocketed springs 84 upstream of the cut being moved by a conveyor system to an off-line position from the portion or part of the combined string of pocketed springs 84 downstream of the cut. The portion or part of the combined string of pocketed springs 84 upstream of the cut becomes the second supply string 74.

As shown in FIG. 14, the first supply string 72 is moved in-line with the portion or part of the combined string of pocketed springs 84 upstream of the cut to repeat the process thereby joining a portion of the first supply string 72 to the portion of the combined string of pocketed springs 84 downstream of the welding apparatus 82 to create a sectioned continuous string of springs 86.

Figure 15:
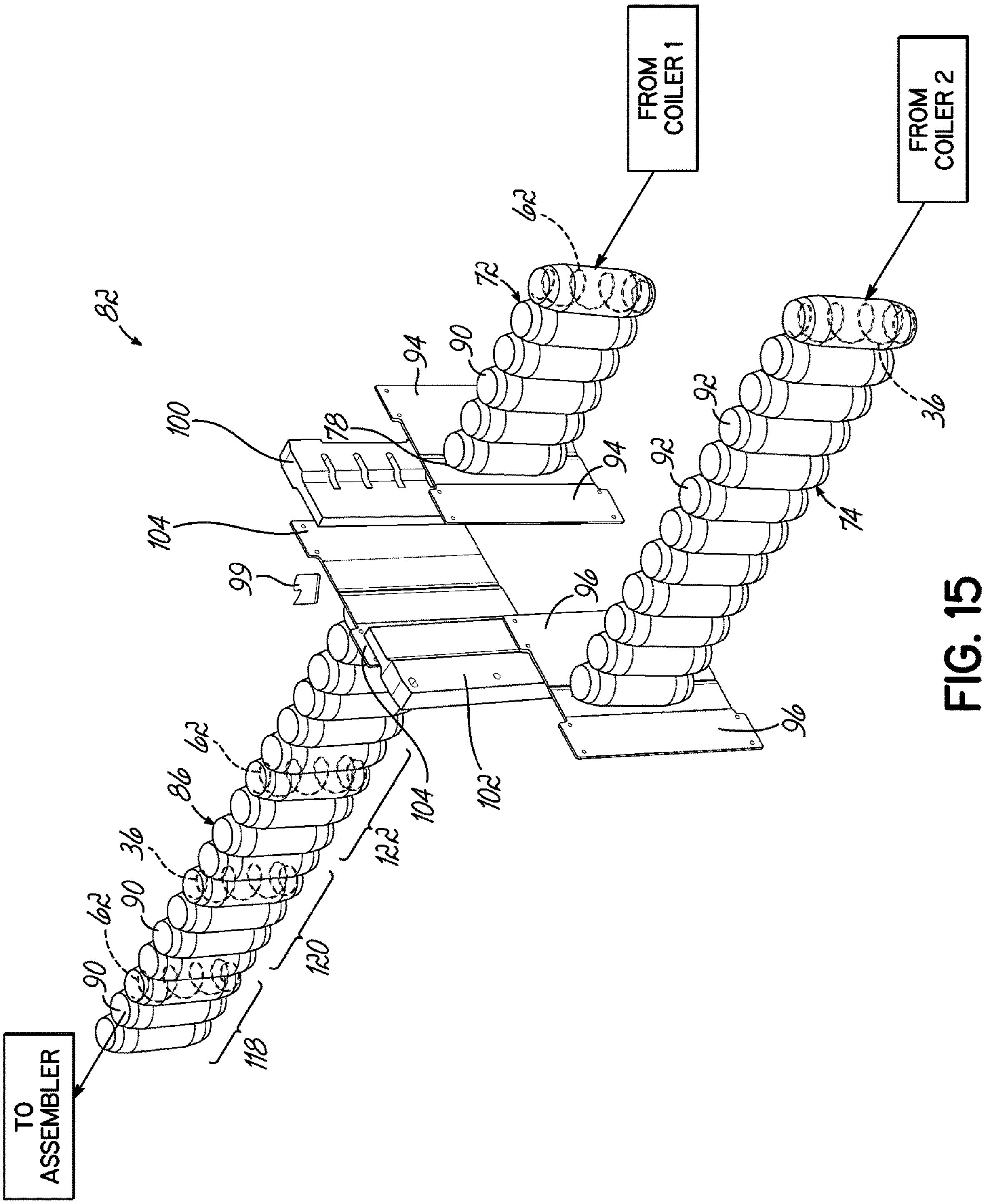
FIG. 15 is a perspective view showing the sectioned continuous string of springs for use in an assembler.

FIG. 15 illustrates the sectioned continuous string of springs 86 downstream of the cutting apparatus 82. The sectioned continuous string of springs 86 comprises a first section 118 of springs 62 from coiler 1 from the original starting string of springs 88, a second section 120 of springs 36 from the second supply string of springs 74 from coiler 2 and a third section 122 of springs 62 from the first supply string of springs 72.

Although the drawings show two different strings upstream of the welding apparatus 82, any number of strings of different strings may be positioned upstream of the welding apparatus 82 and moved by any known conveyor system into and out of an in-line position with the downstream string of pocketed springs.

It is also with the scope of the present invention that the positions of the first and second supply strings be interchanged in the method shown in FIGS. 6-15.

In any of the embodiments shown and described herein, the drawings given are merely examples and not intended to be limiting. This includes the barrel diameter, out-of-pocket height, in-pocket height and number of convolutions of any of the springs.

Although the pocketed springs have been described herein as barrel-shaped springs, it is within the scope of the invention described herein that the springs be cylindrical, an hour-glass shape of some other shape. Likewise, the pocketed springs need not be symmetrical, but may be any desired known configuration.

Figure 16:
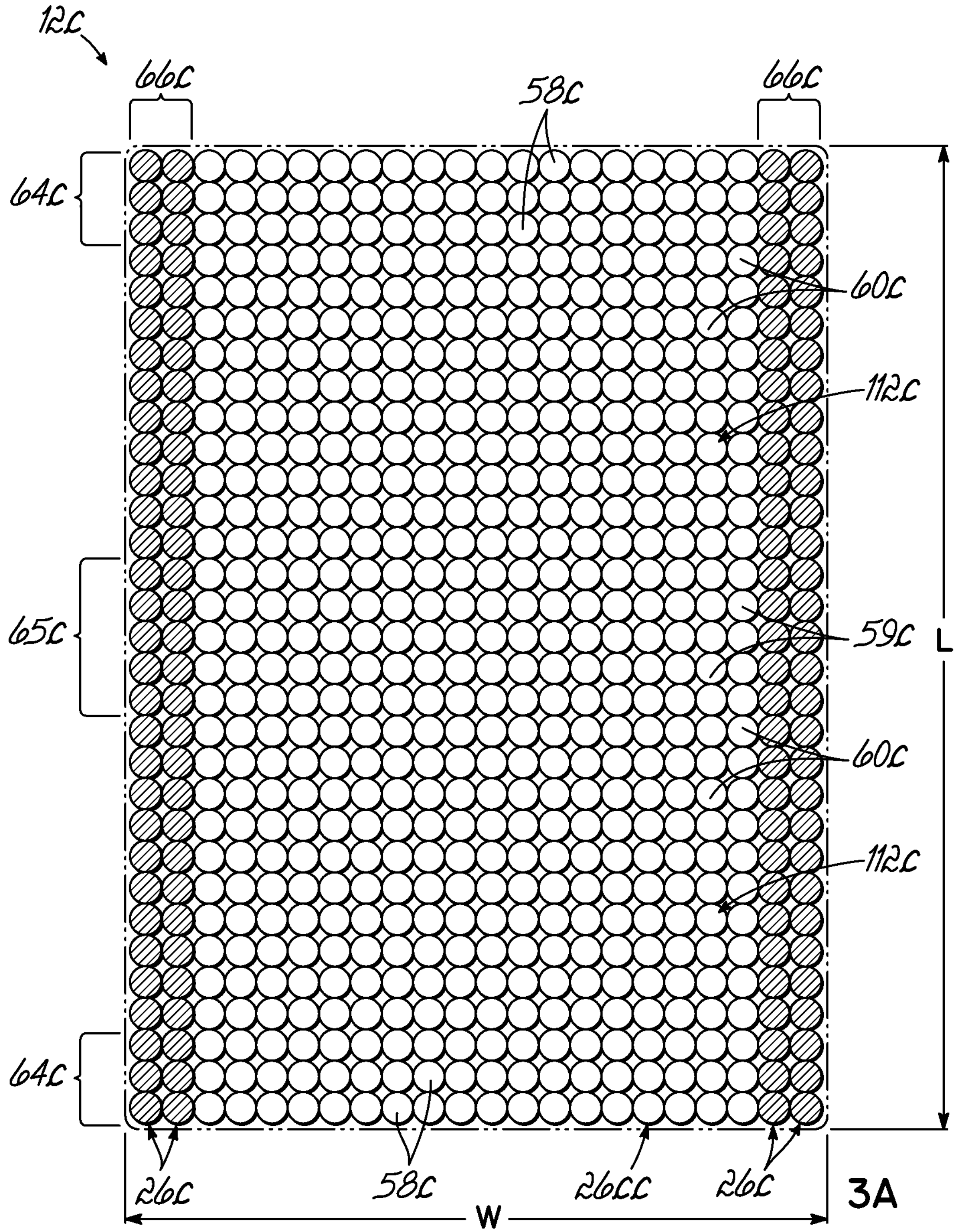
FIG. 16 is a top view of another embodiment of pocketed spring assembly.

FIG. 16 illustrates another embodiment of pocketed spring assembly 12*c*. Pocketed spring assembly 12*c* is manufactured from exterior and interior strings 26*c*, 26*cc* of pocketed springs, respectively, joined together. Each string of pocketed springs 26*c*, 26*cc* extends longitudinally or from head-to-foot along the full length of the assembly 12*c*.

As shown in FIG. 16, pocketed spring assembly 12*c* has opposite end sections 64*c* and a middle section 65*c* made up of pocketed springs. The end sections 64*c*, side sections 66*c* and middle section 65*c*, each containing pocketed springs make up a picture-frame shape of edge support which provides increased stiffness around the perimeter of the pocketed spring assembly 12 and across the back of a user. The end sections 64*c*, side sections 66*c* and middle section 65*c* have firmer pockets than the pockets of the white interior pockets of the interior strings 26*cc*.

Each of the interior strings 26*cc* of pocketed spring assembly 12*c* is identical and comprises three outer pockets 58*c* on each end and three middle pockets 59*c*, each containing a pocketed spring. Between the outer pockets 58*c* and middle pockets 59*c* are inner pockets 60*c*, each inner pocket 60*c* containing at least one spring. Instead of one core section 112, like in pocketed spring assembly 12, pocketed spring assembly 12*c* has two core sections 112*c* on opposite sides of the middle section 65*c*. Although FIG. 16 illustrates one middle section 65*c* of increased firmness for lumbar or back support, those skilled in the art will appreciate multiple sections of increased firmness may be incorporated into a pocketed spring assembly at any desired locations by modifying the composition of the interior strings of the pocketed spring assembly.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, foam resilient members may be used instead of coil springs. The invention resides in each individual feature described herein, alone, and in all combinations of any and all of those features. Accordingly, the scope of the invention shall be limited only by the following claims and their equivalents.

What is claimed is:

1. In combination, a first supply string of springs, a second supply string of springs and a welding apparatus, the combination comprising:

a first supply string of springs;

a second supply string of springs; and a welding apparatus for joining two strings of pocketed coil springs, the welding apparatus comprising;

a first set of clamps for holding and moving an upstream tab of a starting string of pocketed coil springs, the starting string of pocketed coil springs being downstream of the clamps, a second set of clamps for holding and moving a downstream tab of the first supply string of pocketed coil springs, the second set of clamps being offset from the first set of clamps, a third set of clamps for holding and moving a downstream tab of the second supply string of pocketed coil springs, the third set of clamps being in-line with the first set of clamps, a cutter movable between a raised position when it is not being used and a lowered position;

a welding horn, and an anvil, the welding horn and anvil being moveable between the first and third sets of clamps.

2. The combination of claim 1 wherein the second set of clamps may be interchanged with the third set of clamps.

3. The combination of claim 1 further comprising first and second coilers.

4. The combination of claim 1 wherein the welding horn and anvil are moved together between the first and third sets of clamps to weld overlapping tabs of fabric together in a weld.

5. The combination of claim 1 wherein the welding horn and anvil are separated to allow a combined string of pocketed coil springs to move downstream.

6. The combination of claim 5 wherein the first set of clamps are separated to allow the combined string of pocketed coil springs to move downstream.

7. The combination of claim 1 further comprising an assembler downstream of the welding horn and anvil.

8. In combination, a first supply string of springs, a second supply string of springs and a welding apparatus, the combination comprising:

a first supply string of springs;

a second supply string of springs; and a welding apparatus comprising a welding horn, an anvil, the welding horn and anvil being moveable between open and closed positions, a first set of clamps for holding and moving an upstream tab of a starting string of pocketed coil springs, the starting string of pocketed coil springs being downstream of the welding horn and anvil, a second set of clamps for holding and moving a downstream tab of a first supply string of pocketed coil springs, the second set of clamps being upstream from the welding horn and anvil, a third set of clamps for holding and moving a downstream tab of a second supply string of pocketed coil springs, the third set of clamps being upstream from the welding horn and anvil; and a cutter movable between a raised position when it is not being used and a lowered position.

9. The combination of claim 8 wherein one of the second and third sets of clamps is in-line with the first set of clamps.

10. The combination of claim 9 wherein the other of the second and third sets of clamps is offset from the first set of clamps.

11. The combination of claim 8 wherein the cutter is upstream of the first set of clamps.

12. The combination of claim 8 wherein the first set of clamps open and close with the welding horn and anvil.

13. The combination of claim 8 further comprising first and second coilers.

14. The combination of claim 8 wherein the springs within strings having tabs welded together come from different coilers.

15. In combination, a first supply string of springs, a second supply string of springs and a welding apparatus, said combination comprising:

a first supply string of springs;

a second supply string of springs; and a welding apparatus comprising a welding horn, an anvil, the welding horn and anvil being moveable between open and closed positions, a first set of clamps for holding and moving an upstream tab of a starting string of pocketed coil springs originating from a first coiler, the starting string of pocketed coil springs being downstream of the welding horn and anvil, a second set of clamps for holding and moving a downstream tab of a first supply string of pocketed coil springs originating from the first coiler, the second set of clamps being upstream from the welding horn and anvil, a third set of clamps for holding and moving a downstream tab of a second supply string of pocketed coil springs originating from a second coiler, the third set of clamps being upstream from the welding horn and anvil; and a cutter movable between a first position when it is not being used and a second position.

16. The combination of claim 15 wherein each of the second and third sets of clamps is movable between an offset position and an in-line position, in-line with the starting string of pocketed coil springs.

17. The combination of claim 15 wherein the springs within strings having tabs welded together come from different coilers.

18. The combination of claim 15 wherein the welding horn and anvil are moveable between the first set of clamps and one of the second and third sets of clamps.

19. The combination of claim 15 wherein the welding horn and anvil create a combined string of springs comprising the starting string of pocketed coil springs and one of the other strings of pocketed coil springs.

20. The combination of claim 19 wherein the welding horn and anvil are open allowing the combined string of pocketed coil springs to move to an assembler.

* * * * *